US006637704B2

(12) United States Patent
Jette

(10) Patent No.: US 6,637,704 B2
(45) Date of Patent: Oct. 28, 2003

(54) FLEXIBLE CABLE SUPPORT APPARATUS AND METHOD

(76) Inventor: Roger Jette, 38 W. Islip Rd., West Islip, NY (US) 11795

( * ) Notice: Subject to any disclaimer, the term of this patent is extended or adjusted under 35 U.S.C. 154(b) by 0 days.

(21) Appl. No.: 10/178,505

(22) Filed: Jun. 24, 2002

(65) Prior Publication Data

US 2002/0153458 A1 Oct. 24, 2002

Related U.S. Application Data

(63) Continuation-in-part of application No. 09/603,063, filed on Jun. 26, 2000.
(60) Provisional application No. 60/140,915, filed on Jun. 24, 1999, and provisional application No. 60/300,110, filed on Jun. 22, 2001.

(51) Int. Cl.$^7$ .................................................. F16L 3/06
(52) U.S. Cl. ........................................ 248/49; 248/68.1
(58) Field of Search .............................. 248/49, 52, 58, 248/65, 68.1, 75, 302, 51, 67.7; 174/68.1, 68.3, 95, 97, 208, 209

(56) References Cited

U.S. PATENT DOCUMENTS

| | | | |
|---|---|---|---|
| 1,590,910 A | 6/1926 | Rumrill | 248/80 |
| 1,787,106 A | 12/1930 | Glazener | 248/51 |
| 2,082,099 A | 6/1937 | Cruser | 248/49 |
| 2,620,232 A | 12/1952 | King | 239/229 |
| 2,684,512 A | 7/1954 | Beman | 24/26 |
| 2,687,329 A | 8/1954 | Hunter | 238/282 |
| 2,823,001 A | 2/1958 | Whitefield | 248/49 |
| 2,891,750 A | 6/1959 | Bergquist | 248/58 |
| 3,021,102 A | 2/1962 | Kuempel | 248/49 |
| 3,053,358 A | 9/1962 | Gross | 52/696 |
| 3,098,349 A | 7/1963 | Waninger | 59/78.1 |
| 3,321,571 A | 5/1967 | Lynch | 174/101 |
| 3,363,048 A | 1/1968 | Vaughn | 174/72 A |
| 3,588,012 A | 6/1971 | Schaefer | 248/80 |
| 3,687,406 A | 8/1972 | Krahe et al. | 248/55 |
| 4,068,824 A | 1/1978 | Flynn | 254/128 |
| 4,143,845 A | 3/1979 | Harris | 248/220.43 |

(List continued on next page.)

FOREIGN PATENT DOCUMENTS

| | | |
|---|---|---|
| DE | 1 540 323 | 2/1970 |
| DE | 1 615 074 | 4/1970 |
| DE | 7 120 422 | 8/1971 |
| DE | 2 155 625 | 5/1973 |
| DE | 2 358 863 | 5/1974 |
| DE | 7 435 122 | 10/1974 |
| DE | 3 742 448 | 6/1989 |
| EP | 0 298 825 | 1/1989 |
| EP | 0 553 039 | 7/1993 |
| EP | 0 556 137 | 8/1993 |
| EP | 0 571 307 | 11/1993 |
| FR | 2 395 449 | 1/1979 |

*Primary Examiner*—Ramon O. Ramirez
*Assistant Examiner*—Jon Szumny
(74) *Attorney, Agent, or Firm*—Carter, Deluca, Farrell & Schmidt, LLP

(57) ABSTRACT

A cable support apparatus and method. The cable support apparatus includes at least two substantially rigid cable support sections and an elongated flexible member configured and adapted to interconnect the at least two rigid cable support sections to form a flexible junction between the at least two substantially rigid cable support sections. Preferably, the flexible member is bendable, by hand, in at least one of a vertical and a horizontal direction to a selected set configuration. An alternative cable support apparatus includes a rigid spine member and a plurality of cable support members configured and adapted to be selectively mounted to specific locations along the length of the rigid spine member via a snap-fit type engagement. The method of installing includes providing the rigid cable support section and at least one article support member and selectively coupling at least one article support member to the cable support section.

16 Claims, 20 Drawing Sheets

U.S. PATENT DOCUMENTS

| | | | |
|---|---|---|---|
| 4,156,436 A | 5/1979 | Hawk | 137/899 |
| 4,337,934 A | 7/1982 | Cabeney | 269/77 |
| 4,372,510 A | 2/1983 | Skypala | 248/58 |
| 4,432,519 A | 2/1984 | Wright | 248/49 |
| 4,570,437 A | 2/1986 | Moritz | 59/78.1 |
| 4,582,281 A | 4/1986 | Van Camp | 248/51 |
| 4,765,576 A | 8/1988 | Peled | 248/49 |
| 4,840,023 A | 6/1989 | Borsani | 59/78.1 |
| 5,123,618 A | 6/1992 | Guterman et al. | 248/49 |
| 5,240,209 A | 8/1993 | Kutsch | 248/49 |
| 5,323,988 A | 6/1994 | Handler | 248/49 |
| 5,524,327 A | 6/1996 | Mickel et al. | 24/115 A |
| 5,531,410 A | 7/1996 | Simon | 248/49 |
| 5,704,571 A | 1/1998 | Vargo | 248/58 |
| 5,839,702 A | 11/1998 | Jette | 248/49 |
| 5,868,361 A | 2/1999 | Rinderer | 248/58 |
| 5,893,539 A | 4/1999 | Tran et al. | 248/68.1 |
| 6,019,323 A | 2/2000 | Jette | 248/49 |
| 6,140,584 A | 10/2000 | Balsissara | 174/68.3 |
| 6,170,249 B1 | 1/2001 | Blasé et al. | 59/78.1 |
| 6,198,047 B1 | 3/2001 | Barr | 174/68.3 |
| 6,247,871 B1 | 6/2001 | Nickel et al. | 403/396 |

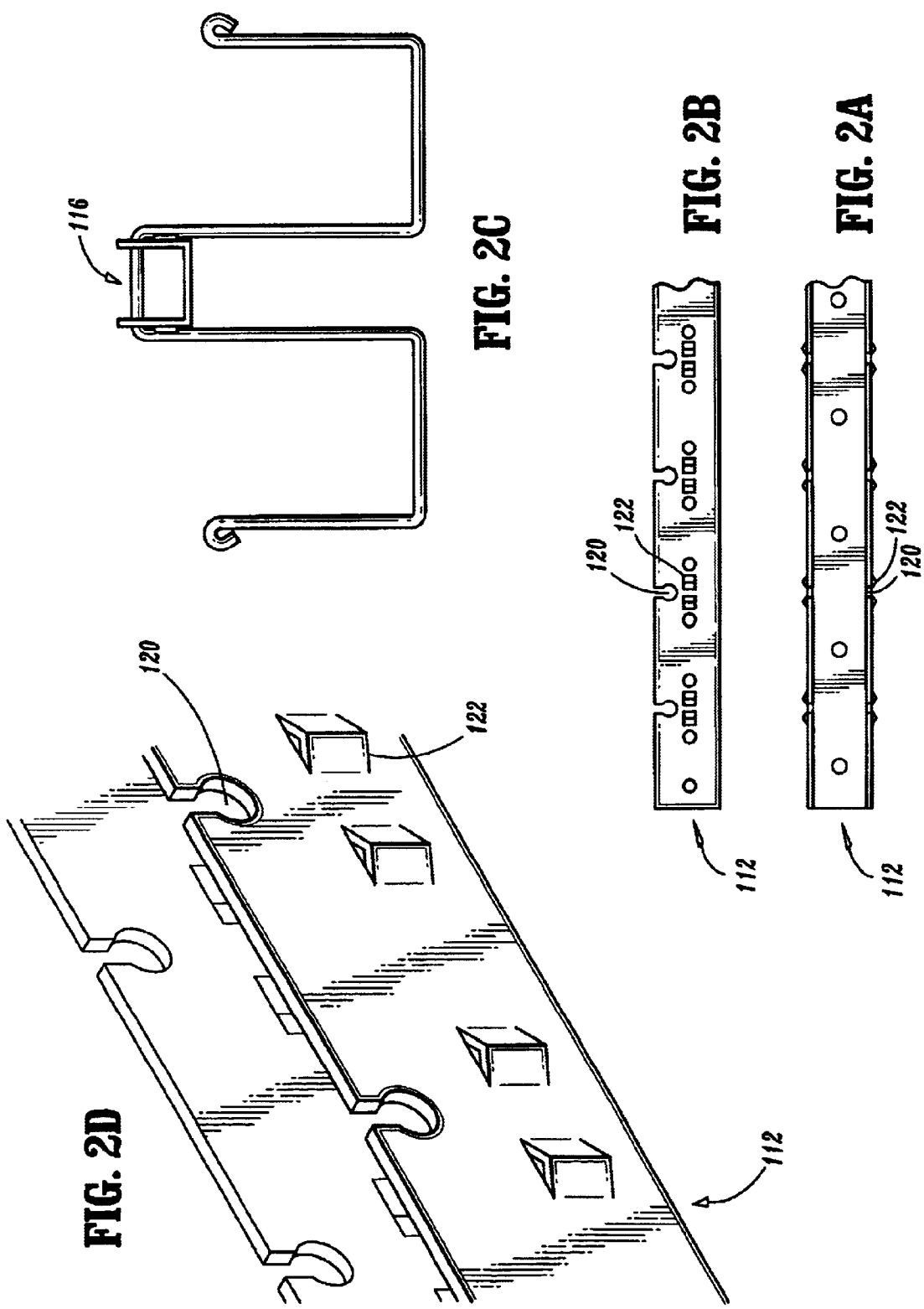

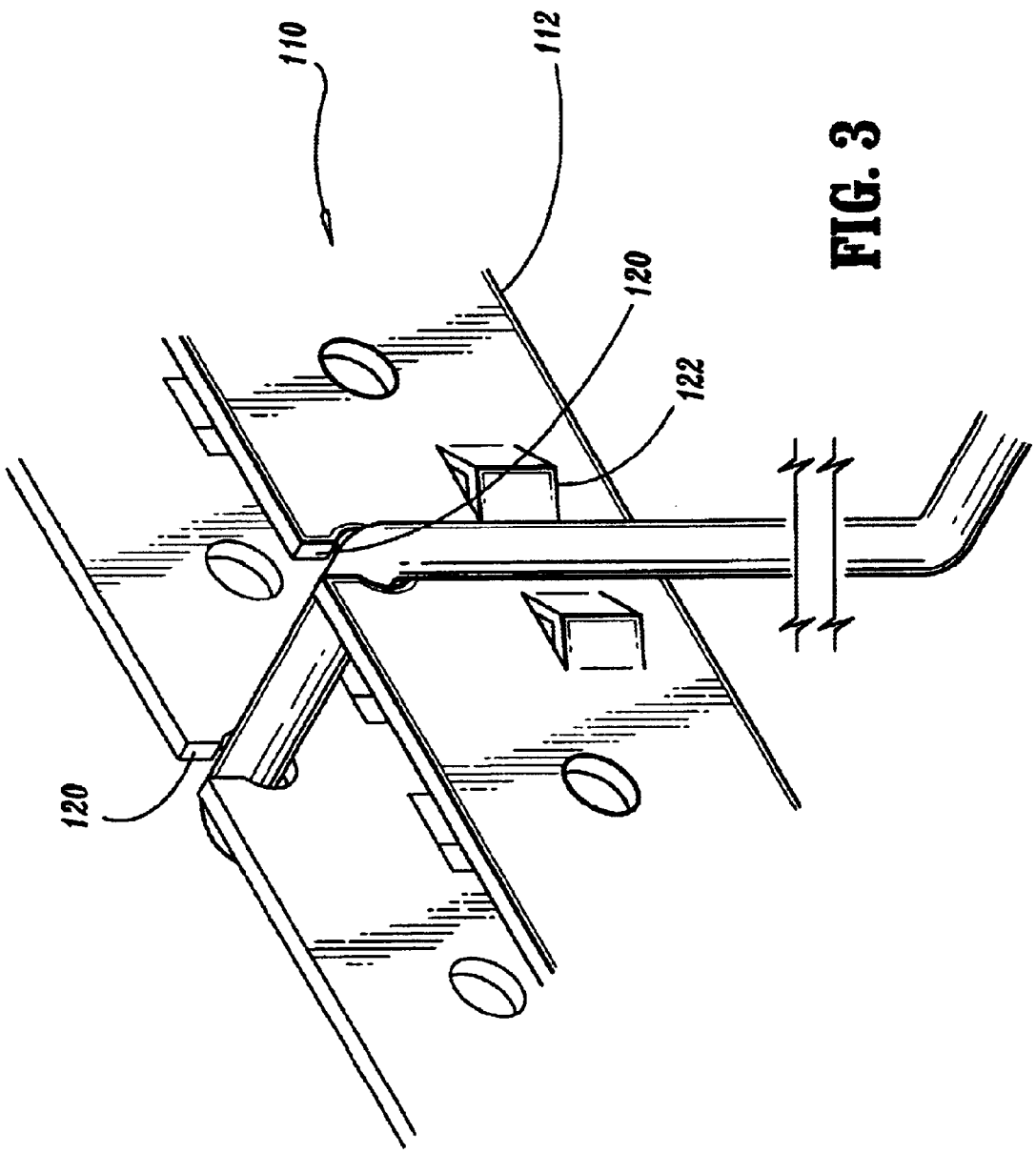

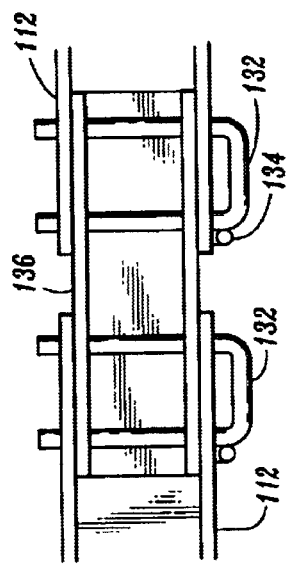
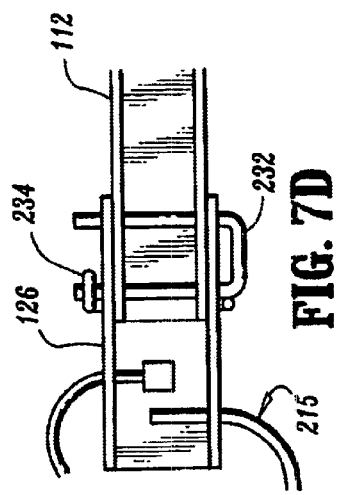
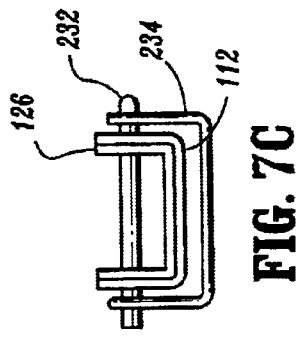
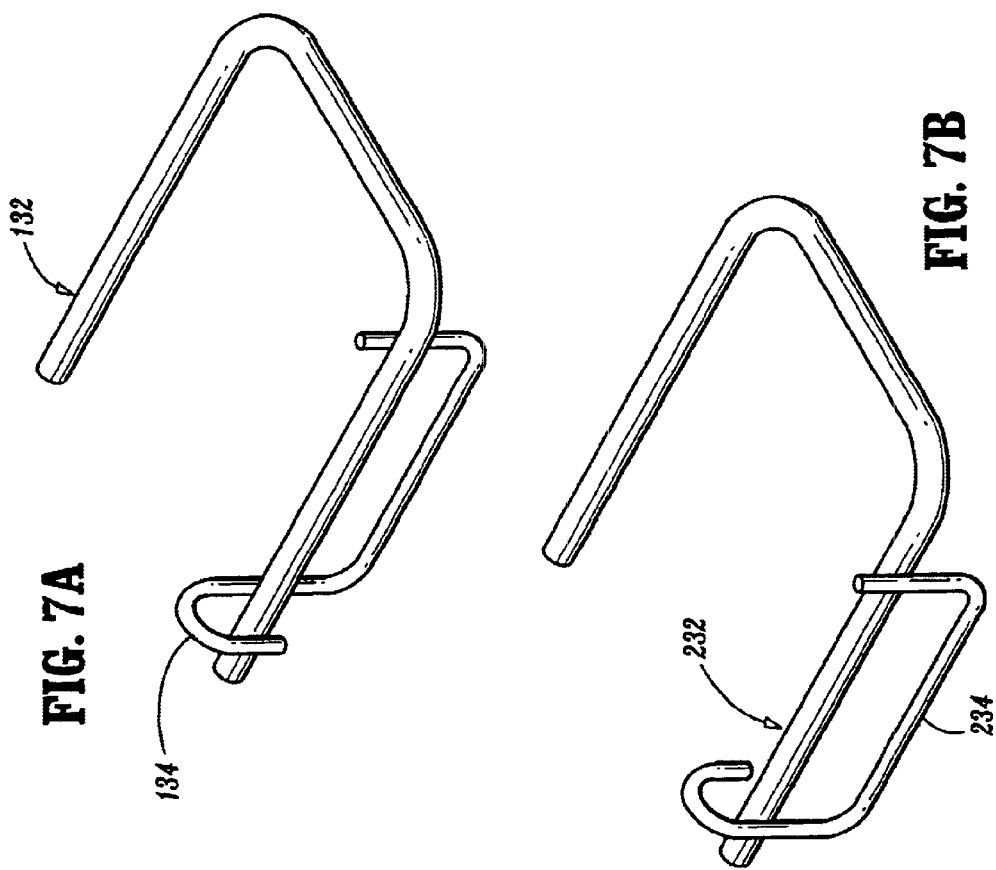

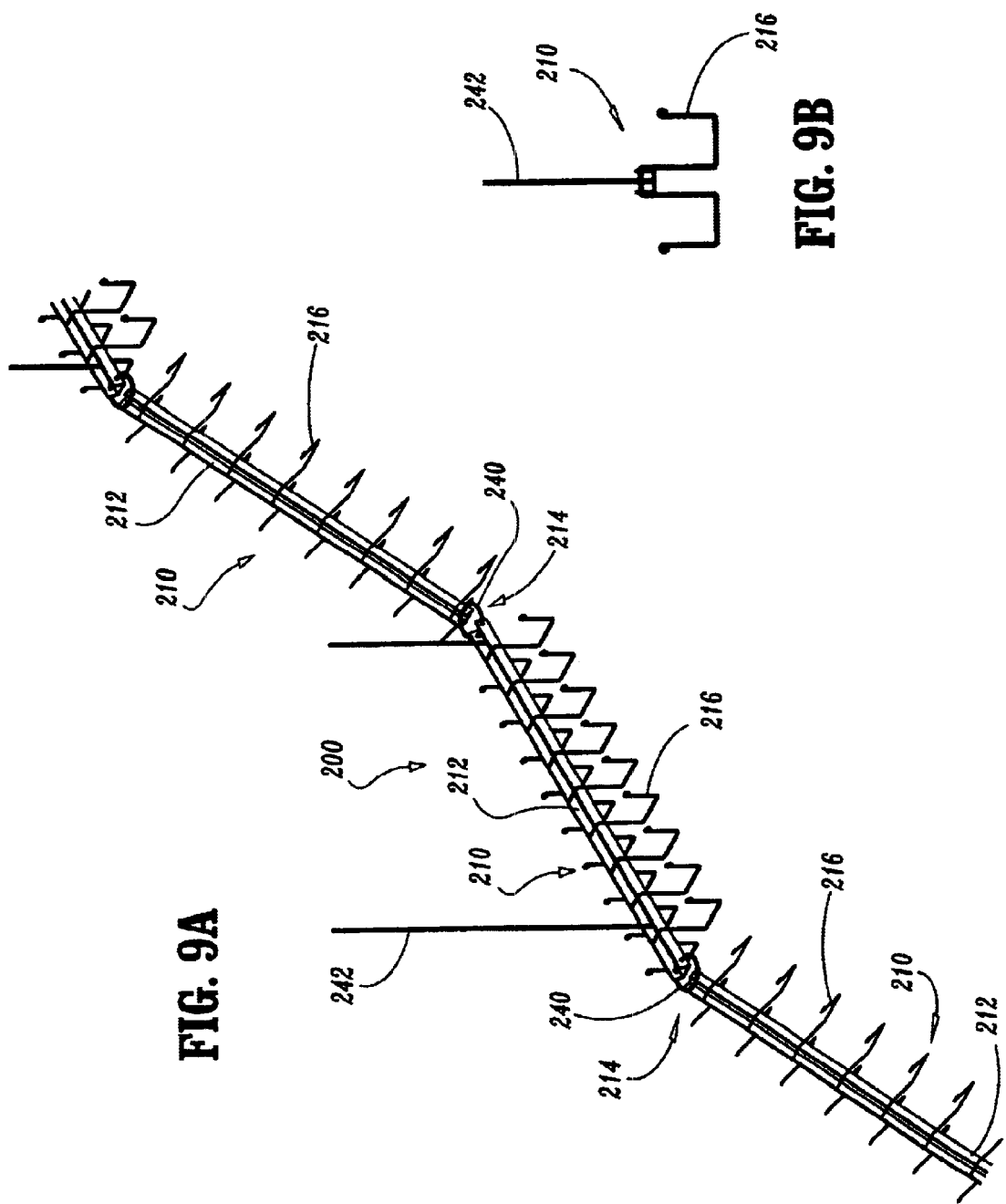

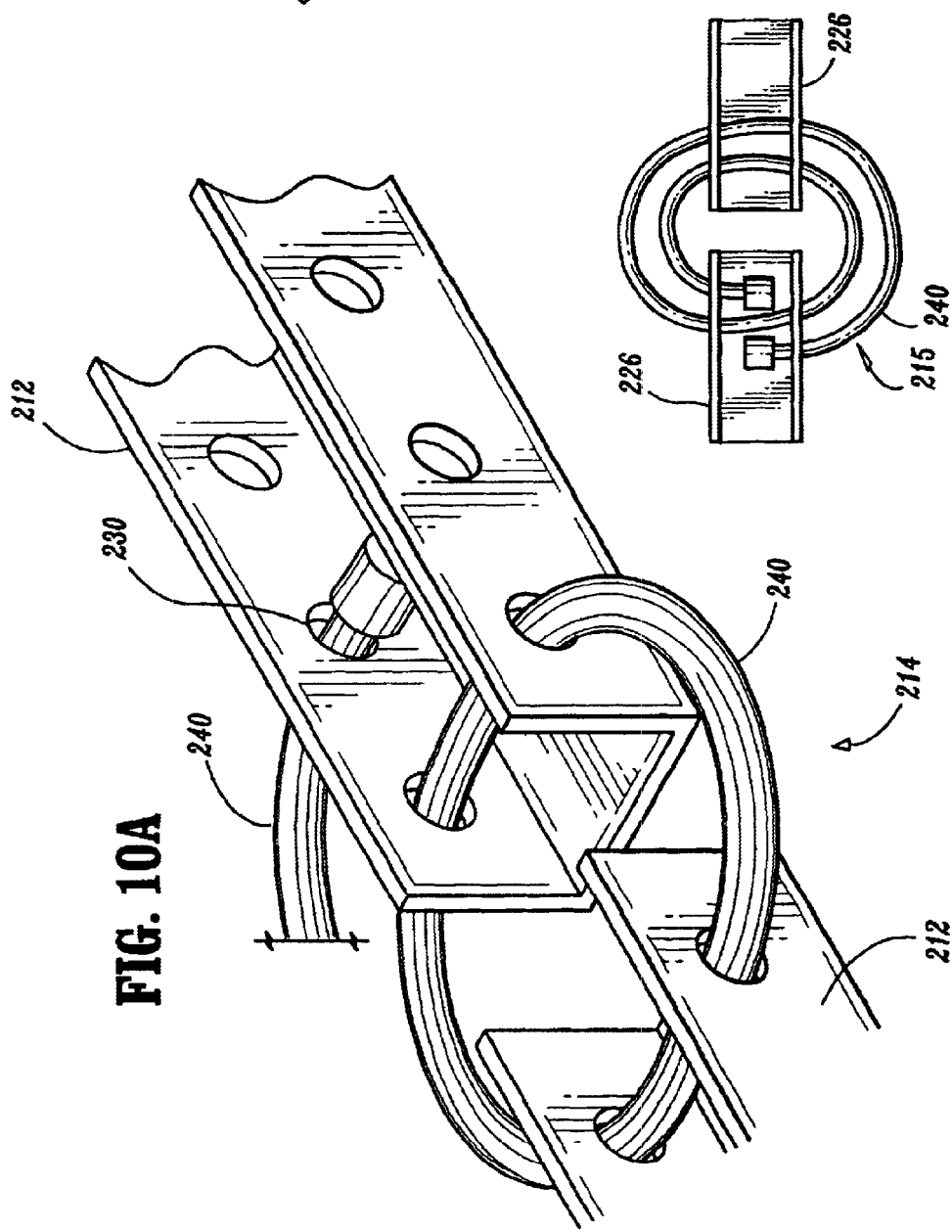
FIG. 10A
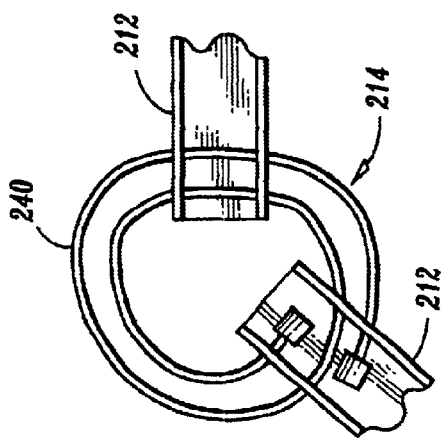
FIG. 10D
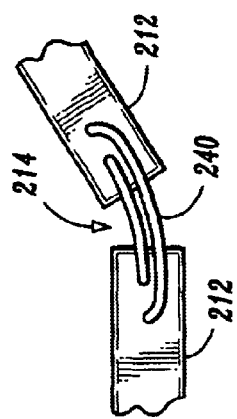
FIG. 10C
FIG. 10B

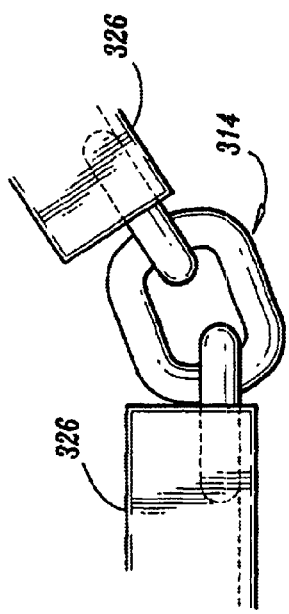
FIG. 11E
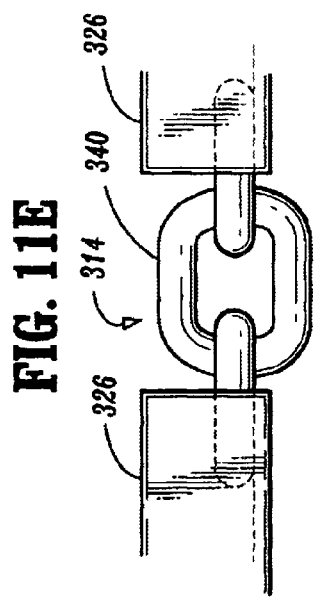
FIG. 11C
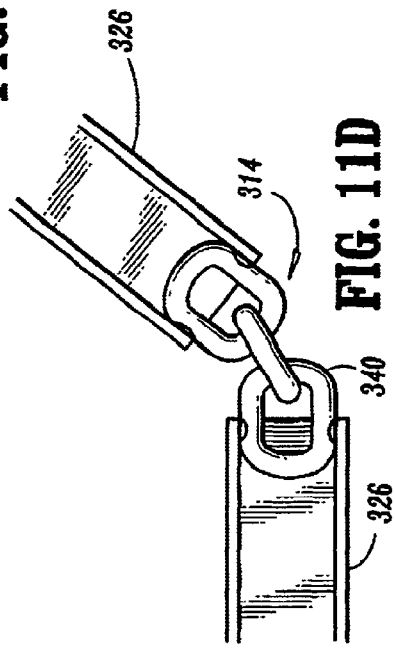
FIG. 11D
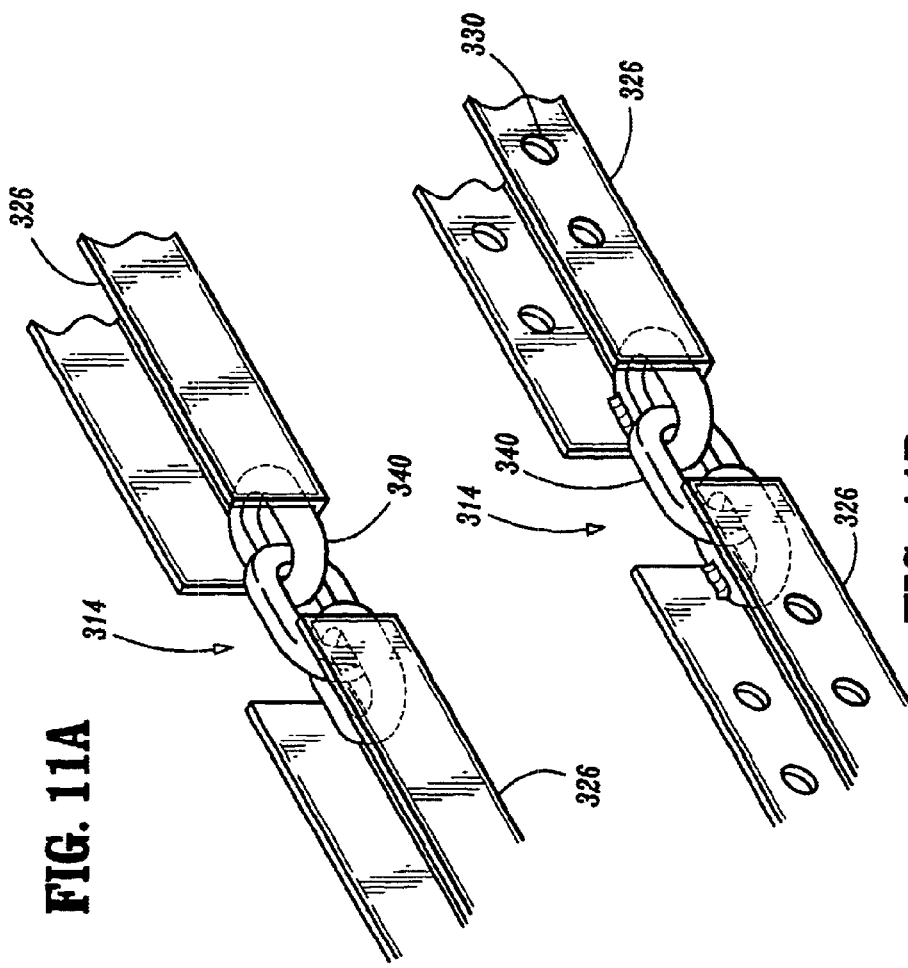
FIG. 11A
FIG. 11B

FLEXIBLE CABLE SUPPORT APPARATUS AND METHOD

CROSS-REFERENCE TO RELATED APPLICATIONS

The present application claims priority of U.S. Provisional Patent Application Ser. No. 60/300,110 filed Jun. 22, 2001; and is a Continuation-in-Part of U.S. patent application Ser. No. 09/603,063 filed Jun. 26, 2000 which claims priority to U.S. Provisional Patent Application Ser. No. 60/140,915 filed Jun. 24, 1999.

BACKGROUND

1. Technical Field

The present disclosure relates to cable support systems and, more particularly, to flexible coupling members of cable support systems for cable management and installation applications as well as selectively couplable cable support apparatus for use in cable support systems. The present disclosure further relates to a method installing a cable support apparatus.

2. Background of Related Art

Due to the ever-increasing usage of computer and telephone networks, greater numbers of cable runs are required to interconnect the various systems and their associated peripheral devices. As a result, various cable management products have been developed to deal with the task of routing the numerous cable runs throughout a facility in an organized fashion. One problem that has made it difficult to rout cable runs through a facility is that each facility has obstacles of one kind or another in the path that the hardware systems are installed in to convey the cable runs. These obstacles, for example, ductwork, walls, beams, lighting fixtures, conduit, etc. are typically in place already at the time cable runs are installed in either new facilities or existing ones where new cable runs are installed. Installing cable-carrying systems, such as cable tray sections, in such an obstacle rich environment can prove to be labor intensive and, therefore, very costly.

A continuing need exists, therefore, for improved, more efficient systems and methods for routing the numerous cable runs around the various obstacles encountered in a facility.

SUMMARY

The present disclosure provides a unique cable support apparatus and method which facilitate an efficient, cost effective solution to the problem of routing numerous cable-runs through a facility while detouring around physical obstacles present in the existing structure.

A cable support apparatus, according to an embodiment of the present disclosure, includes at least two substantially rigid cable support sections defining a pathway for supporting cable and an elongated flexible member interconnecting the at least two rigid cable support sections to form a flexible junction between the at least two substantially rigid cable support sections. The elongate flexible member includes a flexible spine member having a first and a second end and at least one cable support member attached to the flexible spine member. The flexible spine member includes a coupling member formed at each of the first and second ends, each coupling member being configured and adapted to selectively couple the elongate flexible member between the at least two substantially rigid cable support sections. Preferably, the flexible spine member is bendable, by hand, in at least one of a vertical and a horizontal direction to a selected set configuration. Preferably, the coupling member formed at each of the first and second ends of the flexible spine member is a down turned hook, wherein the down turned hook is configured and adapted to rest on a portion of the substantially rigid cable support sections.

In an embodiment, each cable support member of the elongate flexible member is substantially U-shaped. Preferably, each cable support member of the elongate flexible member includes a base portion having two first portions which extend upwardly, at an angle, away from the base portion. Preferably, at least the first portions of the first and last cable support member are provided with inwardly oriented second portions. The inwardly oriented second portions are configured and adapted to engage the substantially rigid cable support sections.

Each of the substantially rigid cable support sections includes a plurality of longitudinal members interconnected by a plurality of transverse cable support members. The longitudinal members and the transverse cable support members define a cable support area having a cross-section which substantially corresponds to the cross-section of the cable support member of the elongate flexible member. The transverse cable support members include a base portion having a first portion extending upwardly, at an angle, from either end thereof and a second portion extending upwardly from the free end of each first portion. The free end of each second portion terminates in a coupling member, wherein the coupling member of the transverse cable support members is configured and adapted to receive the inwardly oriented second portions of the cable support members of the elongate flexible member. The coupling member formed at the ends of the flexible spine member engage the base portion of a transverse cable support member.

In another embodiment, each cable support member of the elongate flexible member is substantially C-shaped and is suspended from the flexible spine member. Preferably, each of the substantially rigid cable support sections includes a rigid longitudinal member supporting a plurality of suspended transverse support members. The transverse support members have a cross-section which substantially corresponds to the cross-section of the cable support member of the elongate flexible member. Preferably, the coupling member formed at the ends of the flexible spine member engage a transverse support member of the substantially rigid cable support sections.

A cable support apparatus, according to an embodiment of the present disclosure, includes a rigid spine member and a plurality of cable support members configured and adapted to be selectively mounted to specific locations along the length of the rigid spine member. Preferably, the rigid spine member has a substantially U-shaped cross-section along the length thereof defined by a pair of vertical wall members and an interconnecting base member. The rigid spine member further includes at least one opposing pair of juxtaposed longitudinally oriented slots formed in the vertical wall members.

Each cable support member includes a U-shaped connecting portion configured and adapted to selectively engage at least one of the pair of juxtaposed longitudinally oriented slots. Preferably, the U-shaped connecting portion of the cable support member includes a pair of joggles configured and adapted to engage a respective one of the pair of vertical wall members in a snap-fit manner.

In an embodiment, each of the plurality of cable support members defines an open architecture transverse support area extending beneath the spine member. In an alternative embodiment, each of the plurality of cable support members defines a transverse support area extending away from the spine member. Preferably, the plurality of cable support members is formed from an elongated wire rod.

It is contemplated that the U-shaped connecting portion of at least one cable support member is configured and adapted to extend through an aperture formed in an article and further into the longitudinally oriented slots in order to support the article.

A method of installing a cable support apparatus is disclosed. The method includes the steps of providing a rigid cable support section, providing at least one article support member configured and adapted to be selectively coupled to the rigid cable support section via a snap-fit engagement and selectively coupling at least one article support member to the cable support section.

The rigid cable support section preferably includes at least a pair of vertical members having a plurality of mated opposing pairs of juxtaposed apertures formed along the length of the vertical members. The at least one article support member is configured and adapted to engage the apertures of each vertical member. It is contemplated that the apertures are longitudinally oriented rectangular slots.

Preferably, each article support member includes a U-shaped connecting portion configured and adapted to selectively engage a pair of juxtaposed apertures in a snap-fit manner. The U-shaped connecting portion of each article support member preferably includes a pair of joggles configured and dimensioned to engage a respective one of the pair of vertical members. In an embodiment, each article support member defines an open architecture transverse support area extending beneath the rigid cable support section. In an alternative embodiment, each article support member defines a transverse support area extending away from the rigid cable support section.

The method further includes the step of passing at least one article support member through an opening formed in an article and through a selected pair of juxtaposed apertures formed along the length of the cable support section.

These and other advantages and features of the apparatus disclosed herein, will become apparent through reference to the following description of embodiments, the accompanying drawings and the claims.

BRIEF DESCRIPTION OF THE DRAWINGS

For a better understanding of the presently disclosed flexible cable support apparatus, reference is made to the following description of exemplary embodiments thereof, and to the accompanying drawing figures, wherein:

FIG. 2A is a top partial view of a spine member of a rigid cable support section;

FIG. 2B is a side partial view of a spine member of a rigid cable support section;

FIG. 2C is an enlarged detailed view of a cable support member;

FIG. 2D is an enlarged perspective partial view of a spine member, which details its point of interface with a cable support member;

FIG. 3 is an enlarged perspective partial view of a spine member with a cable support member installed therein;

FIG. 7A is a detailed enlarged perspective view of a connecting assembly, which joins attachment ends of flexible connecting members with adjacent cable support sections;

FIG. 7B is a detailed enlarged perspective of one embodiment of a connecting assembly, which joins attachment ends of flexible connecting members with adjacent cable support sections;

FIG. 7C is a front view of an attachment end of a flexible connecting member placed inside a spine member with a connecting assembly attached;

FIG. 7D is a top view of one embodiment of an attachment end of a flexible connecting member placed outside a spine member with a connecting assembly attached;

FIG. 7E is a top view of an attachment end of a flexible connecting member placed inside two adjacent spine members with connecting assemblies attached to form a rigid joint;

FIG. 9A is a perspective view of an alternative embodiment of a flexible cable support apparatus, which features an alternative embodiment of a flexible connecting member to link cable support sections;

FIG. 9B is a side view illustrating one method of attaching the cable support apparatus embodiment of FIG. 9A to an overhead member;

FIG. 10A is an enlarged perspective view of an alternative embodiment of the flexible cable support apparatus using a cable to form a flexible connecting member as described in the present disclosure;

FIG. 10B is a top view of the embodiment of FIG. 10A;

FIG. 10C is a side view of the embodiment of FIG. 10A which shows two spine members in a vertical bend configuration;

FIG. 10D is a top view of the embodiment of FIG. 10A which shows two spine members in a lateral bend configuration;

FIG. 11A is an enlarged perspective view of another alternative embodiment of a flexible cable support apparatus which features a chain link as a flexible connecting member;

FIG. 11B is an enlarged detailed perspective view of the embodiment of FIG. 11A;

FIG. 11C is a side view of the embodiment of FIG. 11A in a straight connection;

FIG. 11D is a top view of the embodiment of FIG. 11A in a lateral bend configuration;

FIG. 11E is a side view of the embodiment of FIG. 11A in a vertical bend configuration;

DETAILED DESCRIPTION OF THE PREFERRED EMBODIMENTS

Figure 1:
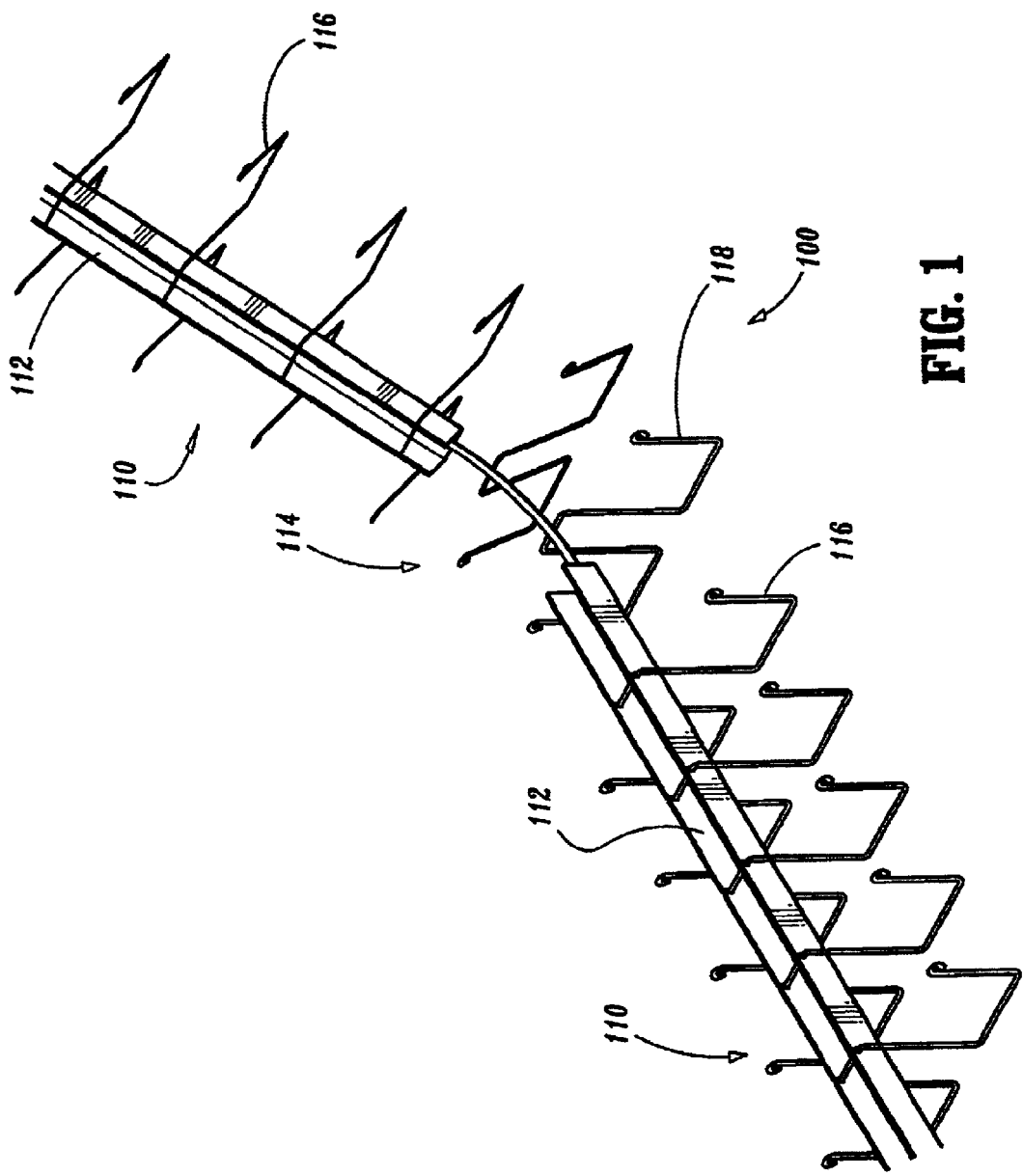
FIG. 1 is a perspective view of one embodiment of a flexible cable support apparatus constructed in accordance with the present disclosure.

Referring to the drawings in detail, and initially to FIG. 1, one illustrative embodiment of the presently disclosed flexible cable support apparatus 100 is shown having a vertical bend formed therein. Such bends can be formed laterally or vertically without the use of tools or other devices. Flexible cable support apparatus 100 includes a plurality of rigid, i.e., fixed configuration, cable support sections, such as section 110, joined together by a bendable connecting member 114 which includes a spine member 124 (see FIG. 5 for details) having a series of cable support members 118 permanently attached thereto. Although shown as straight sections, rigid cable support sections 110 may be of any fixed configuration. For example, support sections 110 may be fixed angled or curved sections in either two or three dimensions.

Cable support members 116 are attached to rigid spine member 112 to form cable support sections 110. Cable support members 116 are preferably formed of wire stock materials of sufficient strength to support a plurality of cables thereon. Alternatively, cable support members 116 may be formed of any suitable material which is configured and dimensioned to support a plurality of cables thereon. Flexible cable support apparatus 100 is preferably configured and dimensioned so that it can be readily installed in numerous different locations. For example, flexible cable support apparatus 100 may be installed beneath raised floor systems, on existing floors, on walls and risers or suspended from a ceiling.

Referring now to FIGS. 2A and 2B, top and side views of cable support section 110 are shown with a plurality of vertically oriented mating holes 120 formed therein and spaced at regular intervals. Each cut out mating hole 120 of a cable support section 110 serves as a mating point for a cable support member 116 which can be installed and retained therein. As shown in FIGS. 2C, 2D and 3, alignment guides such as triangular shaped alignment surfaces such as alignment guides 122 are formed on spine member 112 to inhibit the rotation of cable support members 116 (as best shown in FIG. 3). Paired parallel holes 120 are formed perpendicular to a longitudinal axis of the cable support section 110.

As shown in FIG. 3, the interface between an installed cable support member 116 and spine member 112 of cable support section 110 will now be described in detail. Cable support member 116 is placed into mating hole 120 of a U-shaped channel of cable support section 110. A pair of alignment guides 122 are formed on cable support section 110, one on either side of the installed position of each of the vertical arms of cable support member 116. Alignment guides 122 are positioned to provide stabilizing lateral support for each cable support member 116.

Figure 4F:
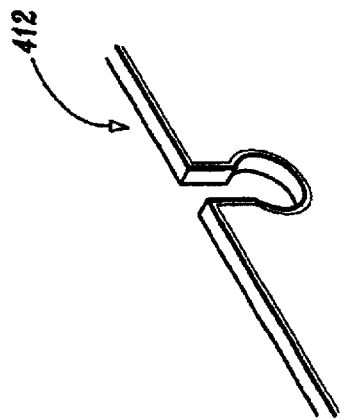
FIGS. 4A–4F are enlarged perspective and profile views of alternative embodiments for fabricating the attachment points for the cable support members on spine member of the cable support section.
Figure 4D:
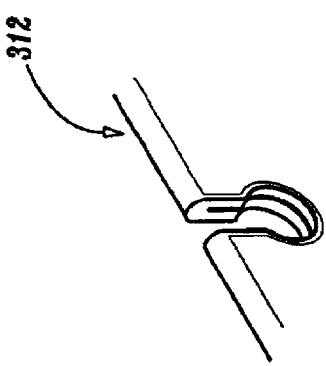
Figure 4B:
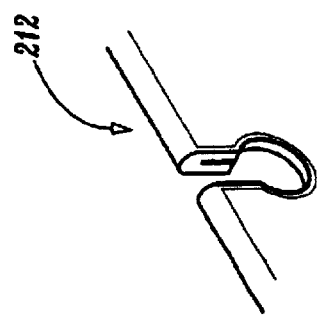
Figure 4E:
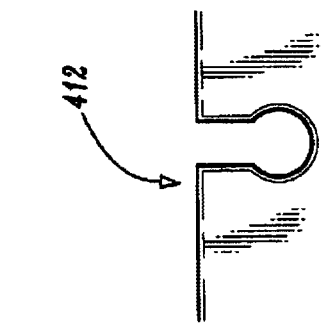
Figure 4C:
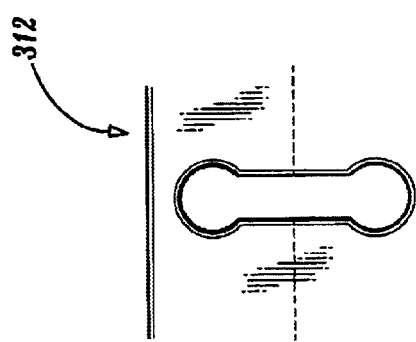
Figure 4A:
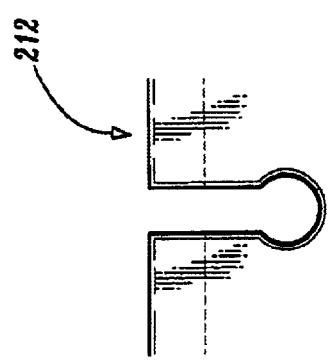

In FIGS. 4A, 4B, and 4C alternative embodiments are shown for fabricating U-shaped spine member 112 of cable support section 110 using formed sheet metal. The free upward pointing ends of the spine member 112 can be formed with a short bend, as in FIG. 4A, to form spine member 212, with a bend that accommodates the full depth of the cut out dimensions for mating hole 120, as in FIG. 4B, to form spine member 312, or as shown in FIG. 4C to form spine member 412 without any bend from thicker sheet metal stock.

Figure 5:
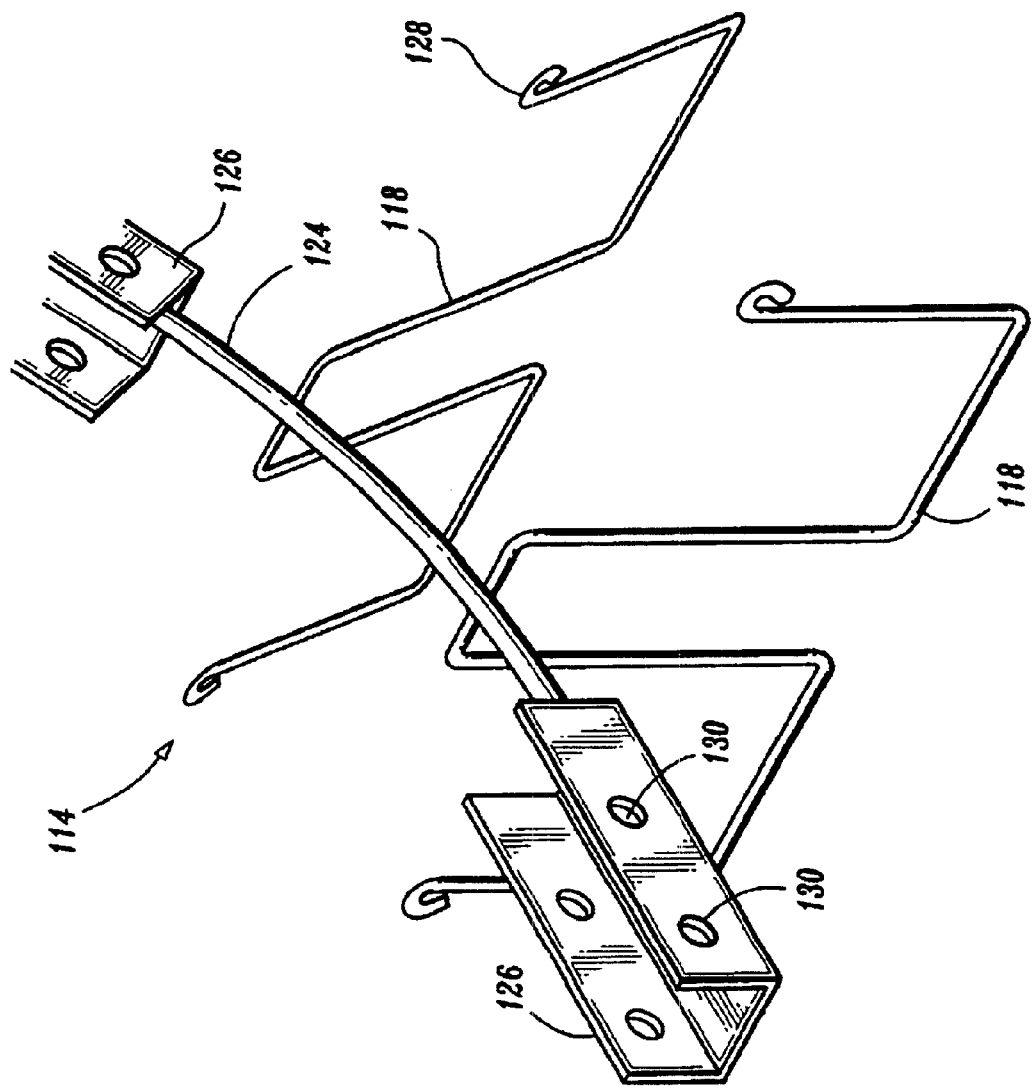
FIG. 5 is a perspective partial view of one embodiment of a flexible connecting member using a bendable spine to join cable support sections of the flexible cable support apparatus.
Figure 6B:
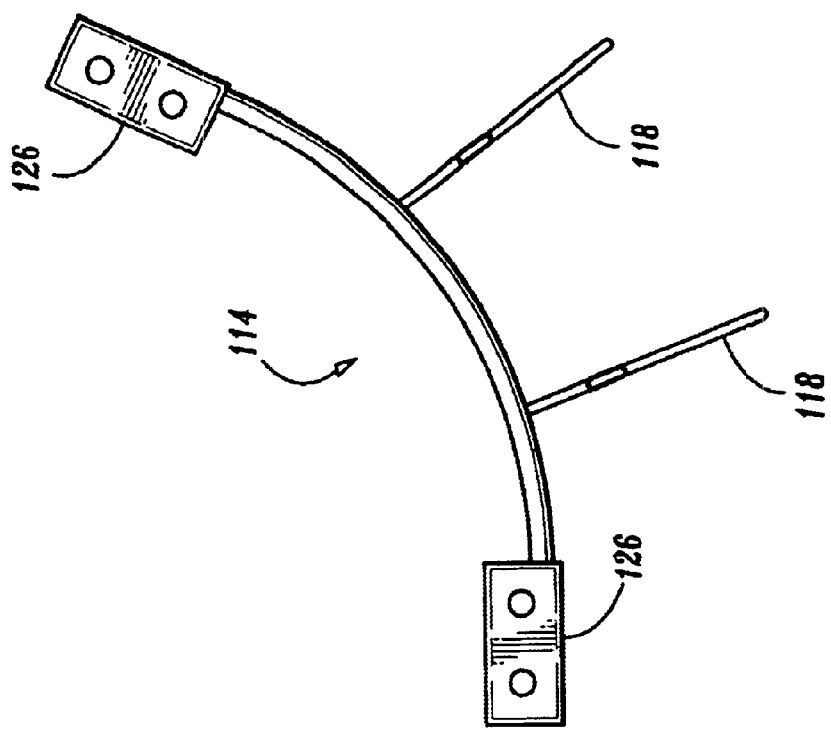
FIG. 6B is a side view of the embodiment of FIG. 6A, which illustrates a configuration for joining cable support sections in a vertical bend.
Figure 6A:
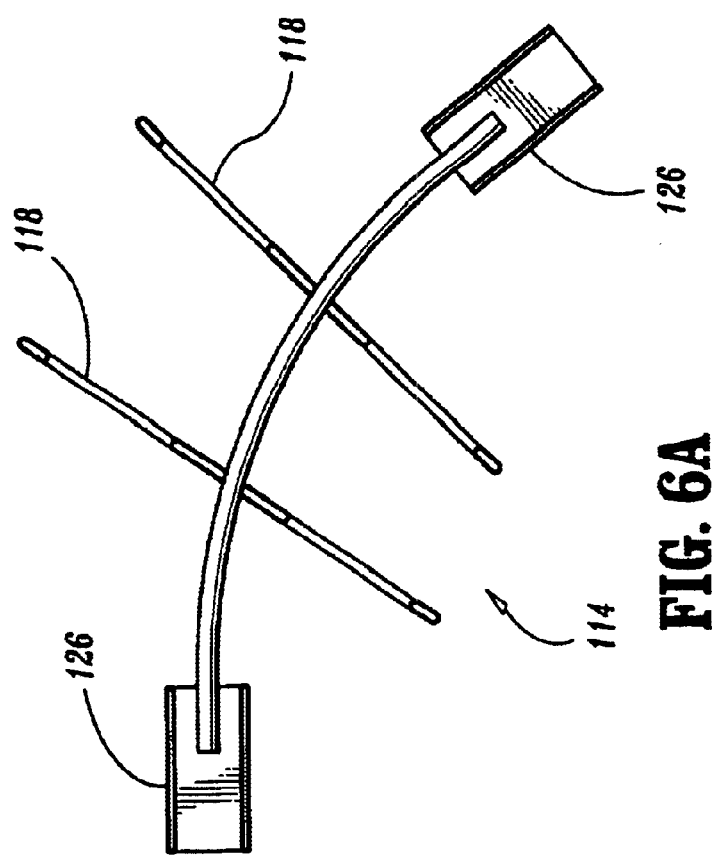
FIG. 6A is a top view of the bendable spine flexible connecting member embodiment which illustrates an embodiment for joining cable support sections in a lateral bend.

One illustrative embodiment for joining the cable support sections 110 of flexible cable support apparatus 100 is flexible connecting member 114 illustrated in FIGS. 5, 6A, and 6B. Flexible connecting member 114 has a bendable spine 124 and U-shaped coupling or attachment members 126 secured on each end that interface with cable support section 110. Attachment members 126 each have a pair of through holes 130 formed therein for connecting with section 110. A series of cable support members 118 are secured, for example, by welding support members 118 to spine 124 of flexible connecting member 114 at regular intervals. Cable support members 118 may be attached either above or below spine 124. Support members 118 are formed in a fashion to allow the maneuvering and protection of any cables supported by the system and may have internally or externally turned ends 128 which provide an atraumatic or smooth surface to prevent damage to cables as well as to reduce injury to installers or individuals working in close contact with cable support apparatus 100. As shown in FIGS. 6A and 6B, flexible connecting member 114 may be bent either laterally or vertically respectively. Flexible connecting member 114 has an attachment end 126, which interfaces with and provides a rigid attachment to section 110. The flexible connecting member 114 includes a series of formed wire cable support members 118 welded to spine 124. Spine 124 of flexible connecting member 114 is configured and dimensioned such that it can be bent by hand in any direction necessary for a particular installation.

One illustrative manner of attaching connecting end 126 of a flexible connecting member 114 to a spine member 112 of section 110 is shown in FIGS. 7A–7D. A U-shaped connecting pin 132 is shown in FIG. 7A with a locking spring bar 134 welded to the inside of the pin and hooking to the outside of the pin. In an alternative embodiment, shown in FIG. 7B, spring bar 234 is welded to the exterior side of connecting pin 232 and hooks inward. As shown in FIGS. 7C and 7D, U-shaped connecting member 126 is placed inside or outside of spine 112 of section 110, with its pairs of through holes 130 aligned with the through holes of spine 112. Then, U-shaped pin, 132 or 232, is inserted through the U-shaped spine 112 and the attachment end 126 to form a rigid joint. As depicted in FIG. 7C, spring bar 232 or 234 is then placed around the exterior of the joined members and hooked around the attached free end of U-shaped connecting pin 132 or 232. Preferably, attachment end 126 is attached to flexible connecting member 114, but connecting members can also be formed of any other suitable type of flexible members, as in FIG. 7D, or a rigid straight connecting member 136 as in FIG. 7E.

Figure 8B:
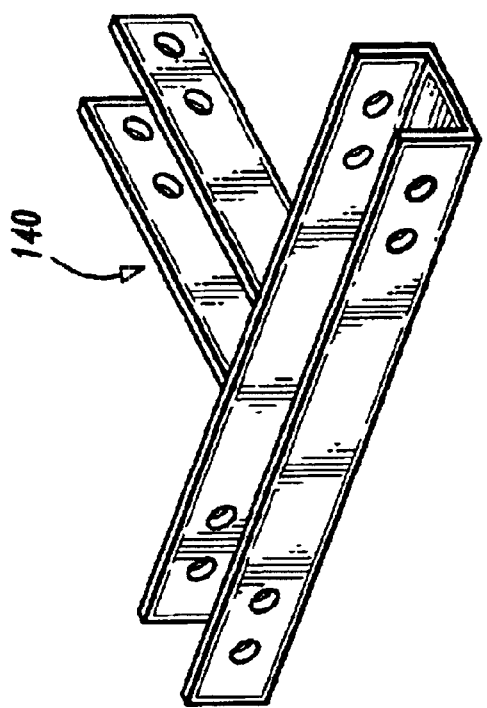
FIG. 8B is a perspective view of a "T" intersection member.
Figure 8A:
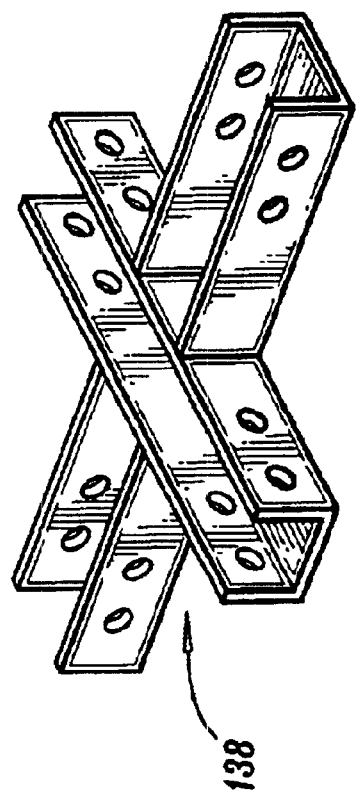
FIG. 8A is a perspective view of a "cross" type intersection member, which can be installed between intersecting cable support sections.

In FIGS. 8A and 8B specialized intersecting members such as four-way "cross" type intersection 138 and a two-way "T" type intersection 140 may be used at various junctions between separate cable support apparatus sections. These specialized intersection members provide an increased versatility for the flexible cable support apparatus users.

In FIGS. 9, 9B and 10A–10D an alternative embodiment of a flexible cable support apparatus constricted in accordance with the present disclosure is designated by the reference numeral 200. Individual cable support sections 210 are shown in FIG. 9A flexibly connected by cables 240, which form connecting member 214. In an alternative embodiment, flexible cables 240 are integrated with coupling or attachment members 226 to form connecting member 215 as shown in FIGS. 7D and 10B. Cable support members 216 are attached to the cable support sections 210.

Referring again to FIGS. 9A and 9B, flexible cable support apparatus 200 can be supported by vertical suspension rods or cables 242 attached to the ceiling or joists, for example, as shown in FIGS. 9A and 9B. The details of the connecting cable flexible member 214 of flexible cable support apparatus 200 are shown in FIGS. 10A–10D. Flexible connecting member 214 includes a flexible cable 240 which is threaded through holes 230 formed near the ends of spine members 212 of cable support sections 210 making a straight connection as shown in FIG. 10A, a vertical view of a straight flexible connection as in FIG. 10B, a vertical bend as in FIG. 10C, and a lateral bend as in FIG. 10D. Flexible connecting member 214 further includes terminal members 244 and 246 which may be crimped to the ends of flexible cable 240 after connection of spine members 212. In this manner, flexible cable is retained in place holding spine members together.

Referring to FIGS. 11A–11D, a further alternative embodiment of the flexible cable support apparatus designated 300 and using flexible connecting member 314 is shown. Flexible connecting member 314 includes chain links 340 secured to U-shaped attachment end 326 having paired through holes 330 formed therein. Flexible connecting member 314 facilitates a straight connection FIG. 11 C; a lateral bend connection FIG. 11D; and a vertical bend without requiring any additional labor or materials in FIG. 11E.

Referring to FIGS. 11A–11E, a further alternative embodiment of the flexible cable support apparatus designated 300 and using flexible connecting member 314 is shown. Flexible connecting member 314 includes chain links 340 secured to U-shaped attachment end 326 having paired through holes 330 formed therein. Flexible connecting member 314 facilitates a straight connection FIG. 11B; a lateral bend connection FIG. 11C; and a vertical bend connection 11D without requiring any additional labor or materials.

Figure 12:
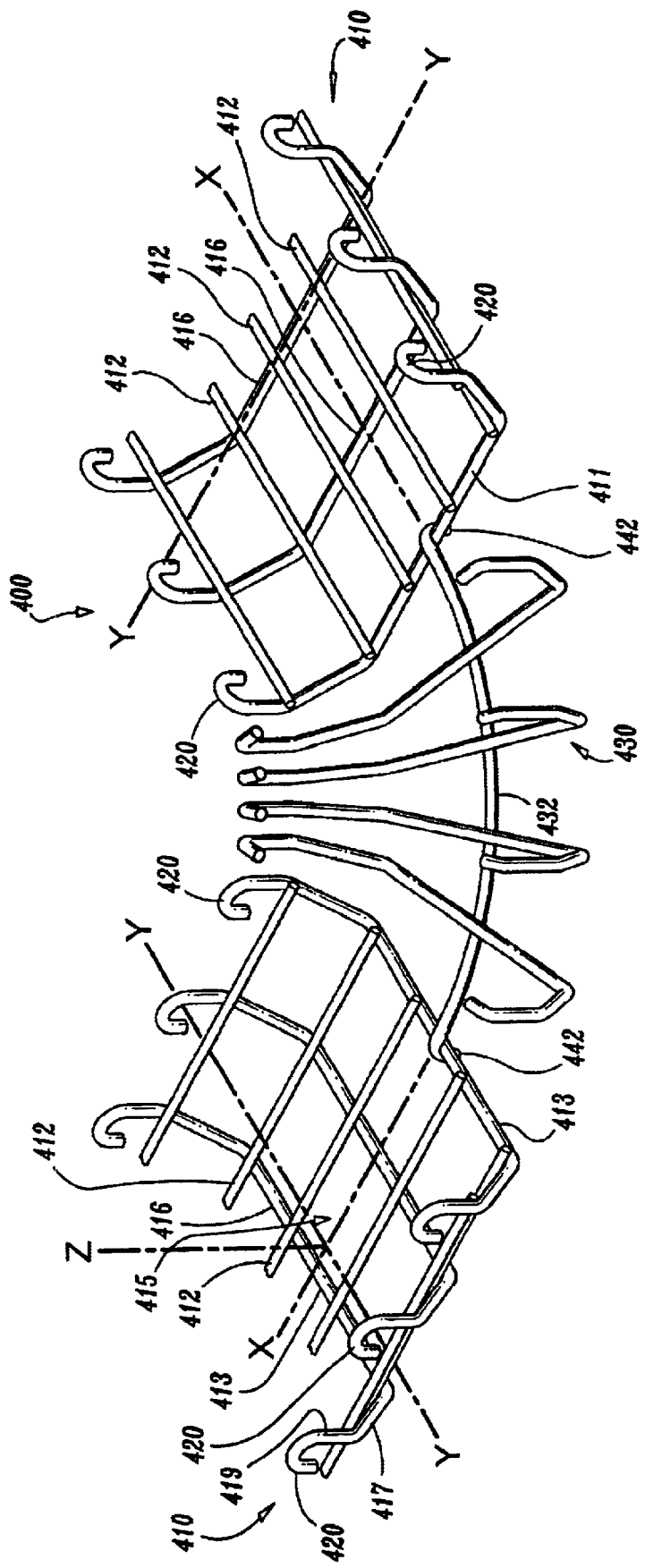
FIG. 12 is a perspective partial view of a further embodiment of a cable support apparatus having a flexible connecting member joining cable support sections of the cable support apparatus in a horizontally flexed position constructed in accordance with the present disclosure.
Figure 13:
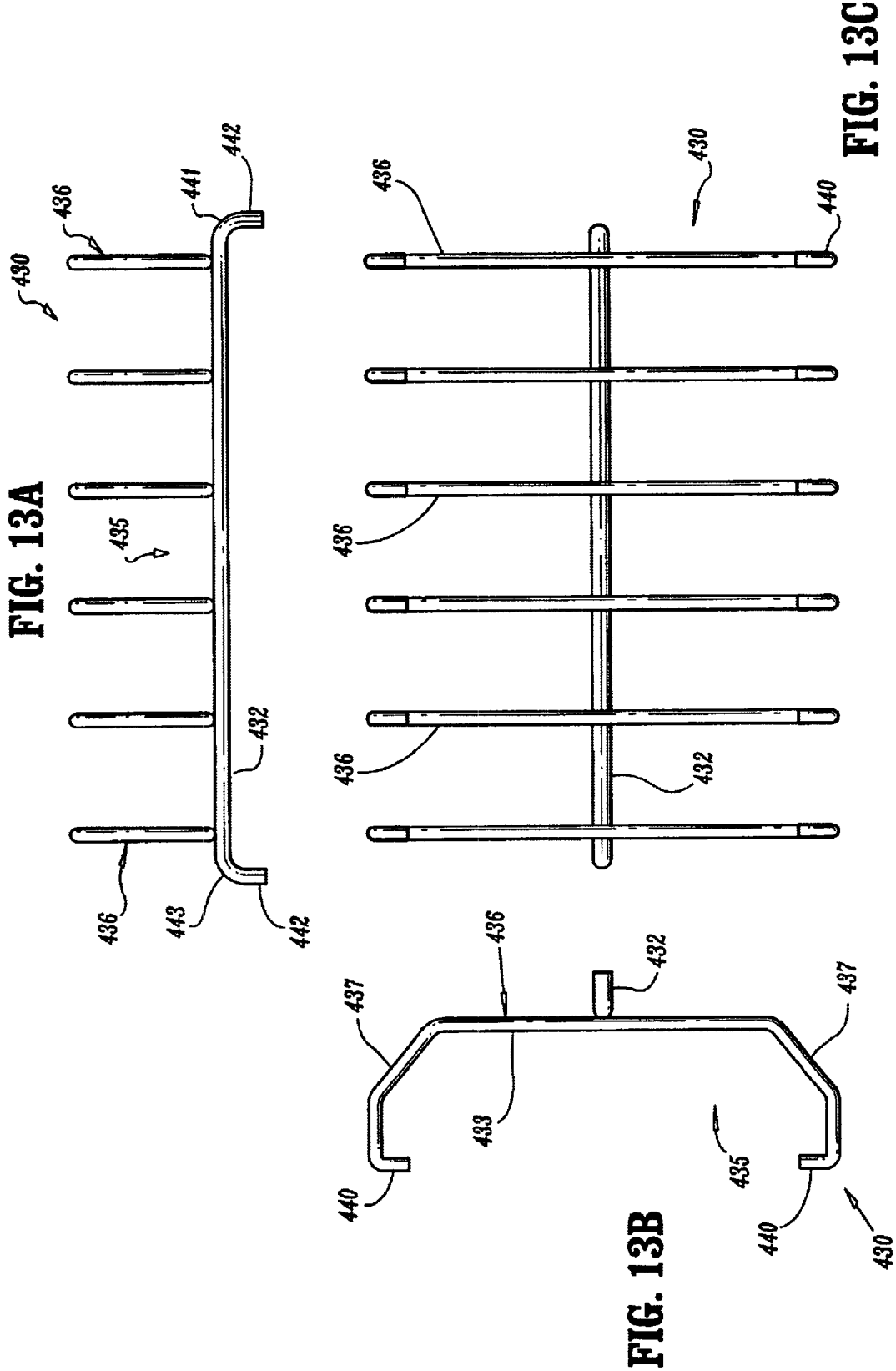
FIG. 13A is a side view of the flexible connecting member of FIG. 12.
FIG. 13B is a frontal view of the flexible connecting member of FIG. 13A.
FIG. 13C is a top view of the flexible connecting member of FIG. 13A.
Figure 14:
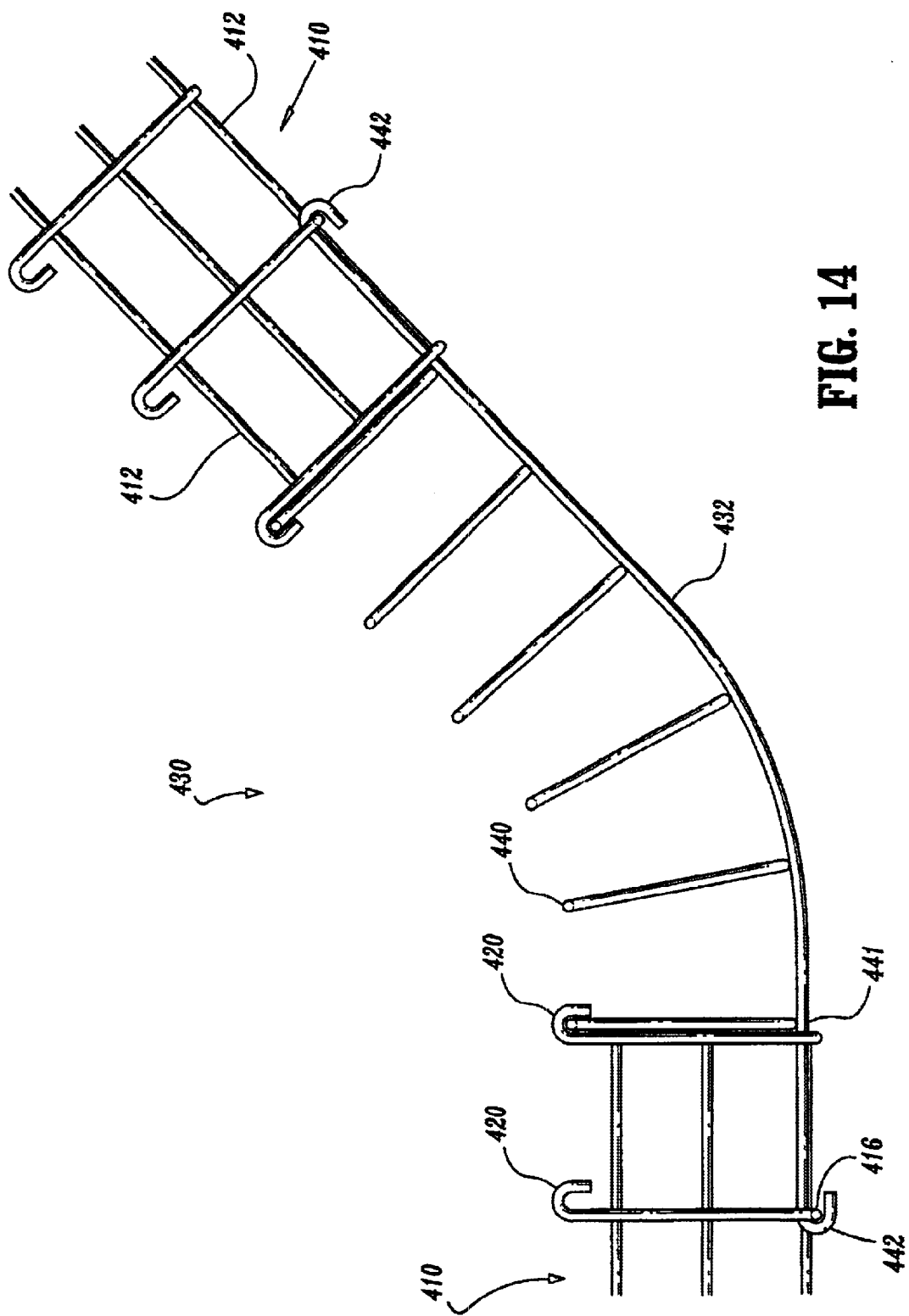
FIG. 14 is a side view of the flexible connecting member of FIG. 12 joining adjacent cable support sections in a vertically flexed configuration.

Referring now to FIGS. 12–14, and initially to FIG. 12, a further embodiment of a flexible cable support apparatus constructed in accordance with the present disclosure, namely, flexible cable support apparatus 400 includes a flexible connecting member 430 joining two rigid cable support sections 410. Bends can be formed by hand in flexible 10 connecting member 430 laterally, vertically, or in combinations thereof, without the use of tools or other devices.

Flexible cable support apparatus 400 includes a plurality of rigid cable support sections 410, having a linear shape defining a longitudinal channel or cable pathway. Cable support sections 410 have a first end portion 411 and a second end portion 412 defining a longitudinal axis "X". First end portions 411 and second end portions 412 are identical in one preferred embodiment. Cable support sections 410 may be joined directly together or by flexible connecting members 430 to form an at least partially contiguous cable pathway. The uniquely advantageous configuration of cable support sections 410 facilitates the stacking of a plurality of sections 410 in a nesting fashion. In this manner, many sections may be stacked in a compact volume thereby requiring less space for storage as well as less space for shipping.

Cable support section 410 includes a plurality of longitudinal members 412 connected with a plurality of cable support members 416. Longitudinal members 412 and transverse cable support members 416 are preferably metal wires or bars of suitable load-bearing capacity, for example, but can also be fabricated from other suitable materials such as composite materials or plastics. Flexible cable support apparatus 400 is preferably configured and dimensioned to support a plurality of cables so that it can be readily adapted to be installed beneath raised floor systems, on existing floors, on walls and risers or suspended from a ceiling.

Cable support members 416 and longitudinal members 412 form a longitudinal cable support area 415 wherein cable support members 416 are transverse to longitudinal members 412. In one preferred embodiment, cable support members 416 form an axis "Y" orthogonal to axis "X". Transverse cable support members 416 form a generally "U" shaped cable support area 415. Cable support member 416 includes a base portion 413, connected with two first portions 417 positioned at an angle relative to an axis "Z", perpendicular to axes "X" and "Y". A second portion 419 extends from first portion 417 and is generally aligned with axis "Z". Second portions 419 terminate in a loop 420 which may be used to facilitate interfacing with a supporting or connecting structure such as a connecting system 480 (see FIG. 16). Loops 420 preferably define at least a portion of an arc or an aperture aligned with axis "Y". Second portions 419 may include more than one loop 420, each loop 420 having different alignments or loops 420 that are bendable or manually changeable for aligning with the supporting or connecting structure.

Referring now to FIGS. 13A–13C, flexible connecting member 430 is shown wherein a flexible spine member 432 structurally supports a plurality of permanently attached transverse cable support members 436. In a first position, prior to bending, cable support members 436 are perpendicular to the at least one flexible spine member 432 and form a generally "U" shaped cable support area 435 cross section that is configured to align and interface with similarly configured cable support areas defined by the configuration of cable support sections 410. Cable support member 436 includes a base portion 433 having two first portions 437 which extend upwardly at an angle away from base portion 433. First portions 437 terminate at a second portion 440 positioned on the ends of the first and last cable support members 436 of flexible connecting member 430. Second portions 440 are short legs which extend inwardly toward the center of cable tray. Second portions 440 are formed such that upon connection of two adjacent cable support sections 410, second portions 440 may be inserted into loops 420 of the end portions 411 and 413.

Flexible spine member 432 has end portions 441 and 443 including at least one extended hook portion 442. End portions 441 and 443, with hook portions 442 are preferably identical and may be configured to engage support members 416 or 436, longitudinal members 412 or at least one flexible spine member 432, or combinations thereof.

Referring now to FIG. 14, bendable connecting support member 430 is illustrated as joining two cable support sections 410 in a vertical bend. In this configuration, end portions 441 and 443, each with hooks 442, are connected with cable support members 416 in the vicinity of first end 411 and second end 413 of two respective cable support sections 410. Two flexible connecting members 430 can also be connected in series by connecting hooks 442 with cable support members 436 and legs 440 with an appropriate connection to a structural support.

Figure 15:
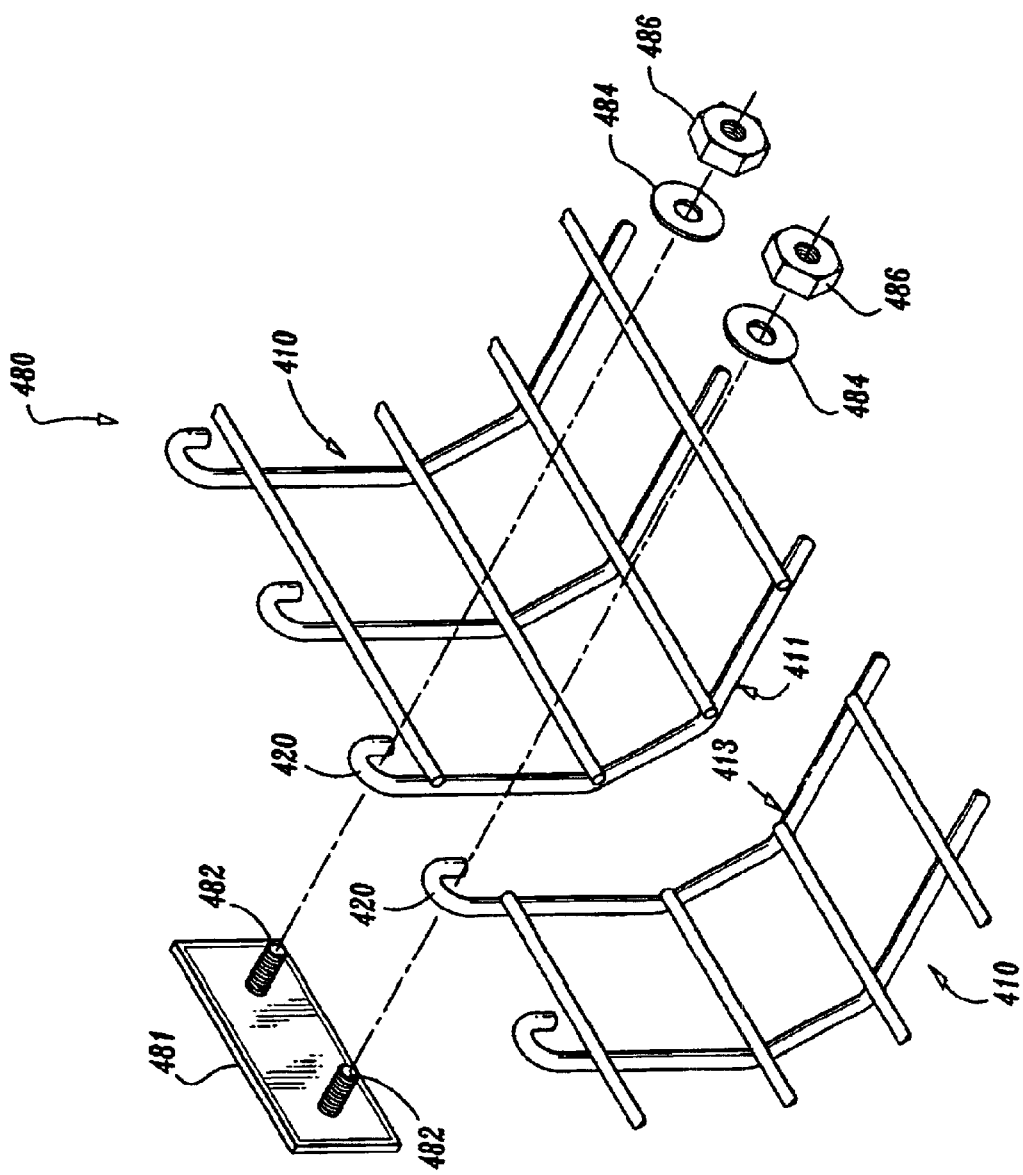
FIG. 15 is a perspective partial view of one embodiment illustrating the attachment of cable support sections or flexible connecting members constructed in accordance with the present disclosure.

Loops 420 on first end portion 411 and second end portion 413 of cable support sections 410 and legs 440 on end portions 441 and 443 of flexible connecting member 430 correspondingly connect with threaded members 482 of connecting system 480 (see FIG. 15). Flexible connecting members 430 can be configured to connect in an end-to-end union or have at least a portion of connecting member 430 extending into and connecting with an interior portion of cable support sections 410 or another flexible connecting member 430 such as transverse cable support members 436 or 416 as well as loops 420 or legs 440. Thus, portions of flexible connecting member 430 could at least partially overlap portions of adjoining flexible connecting members 430 and cable support sections 410. This can advantageously reduce the amount of time consumed in cutting and fitting connecting members 430 and cable support sections 410 together.

Depending upon the intended application, loops 420, legs 440, and hooks 442 may be configured as a full contiguous loop defining an aperture such as a circle or a partial loop having an arc or hook shape. Alternatively, a locking mechanism may be provided to retain the engagement to hook 442 with support member 416. The locking mechanism could be a standard commercial device of suitable structural integrity that is easily installed. Examples include biased snap rings or thread connections.

In FIG. 15, one illustrative method of connecting cable support sections 410 is illustrated with a connecting system 480. Connecting system 480 includes a plate 481 configured for connecting with and being positioned upon a structure, such as for example a vertical structure, and including at least one threaded member 482 extending therefrom. Preferably a pair of threaded members 482 is provided. Each threaded member 482 is configured and dimensioned to be positioned through at least one loop 420, for example, and to have a washer 484 and nut 486 engaged on a distal end thereof. Threaded members 482, washer 484 and nut 486 are standard commercial connecting devices with a load capacity suitable for the intended cable supporting application. Connecting system 480 is configured to connect cable support sections 410 and flexible connecting members 430 as well as other cable supporting systems.

Connecting system 480 includes additional embodiments that support flexible cable support apparatus 400 from a generally horizontal surface such as a floor or ceiling, for example, as well as generally vertical surfaces. Examples include suspending flexible cable support apparatus 400 from cables or rods as well as directly integrating apparatus 400 with a raised floor system.

Figure 16:
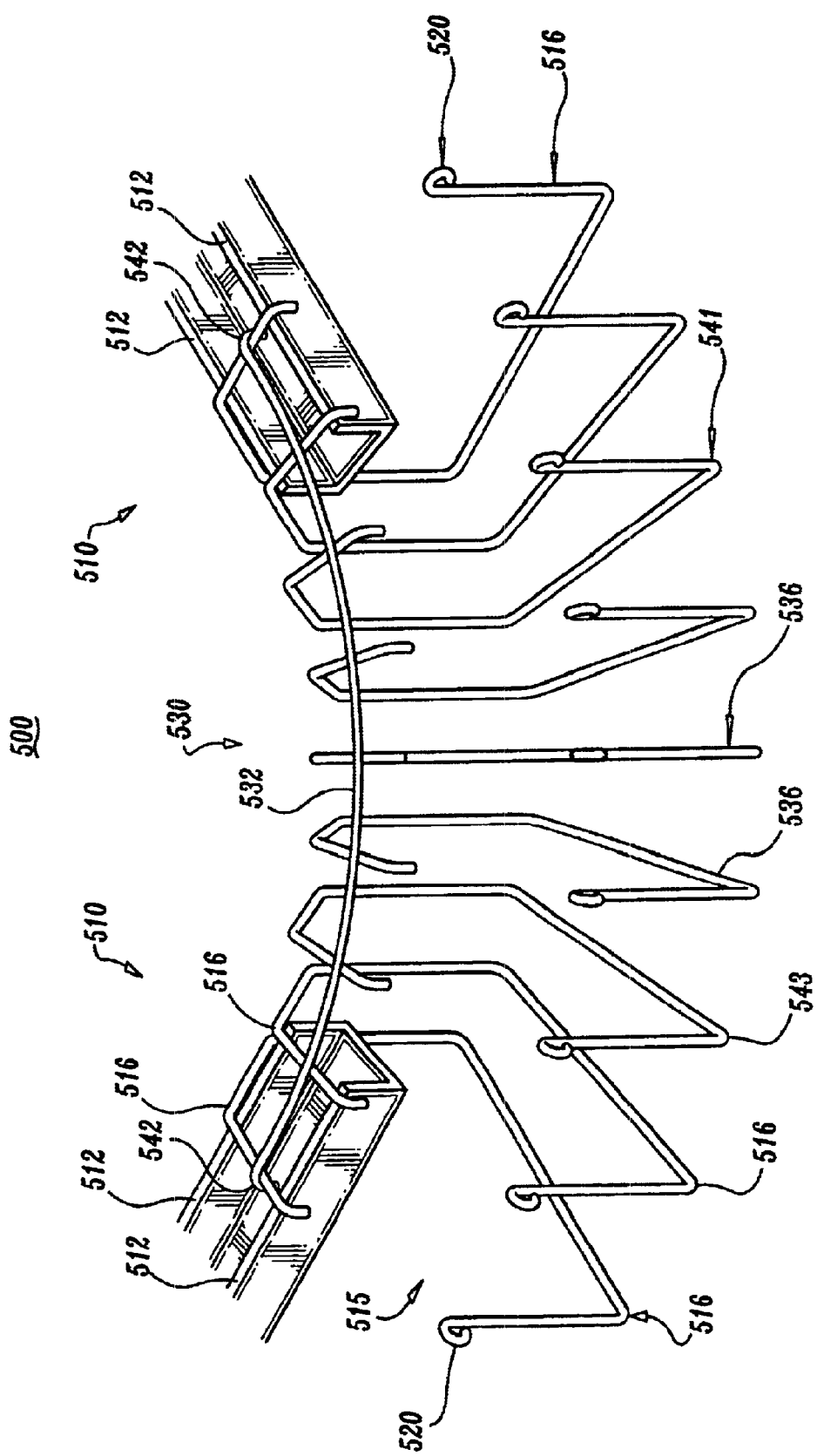
FIG. 16 is a perspective partial view of another embodiment of a flexible cable support apparatus having a connecting member with a bendable spine constructed in accordance with the present disclosure joining adjacent cable support sections.
Figure 17:
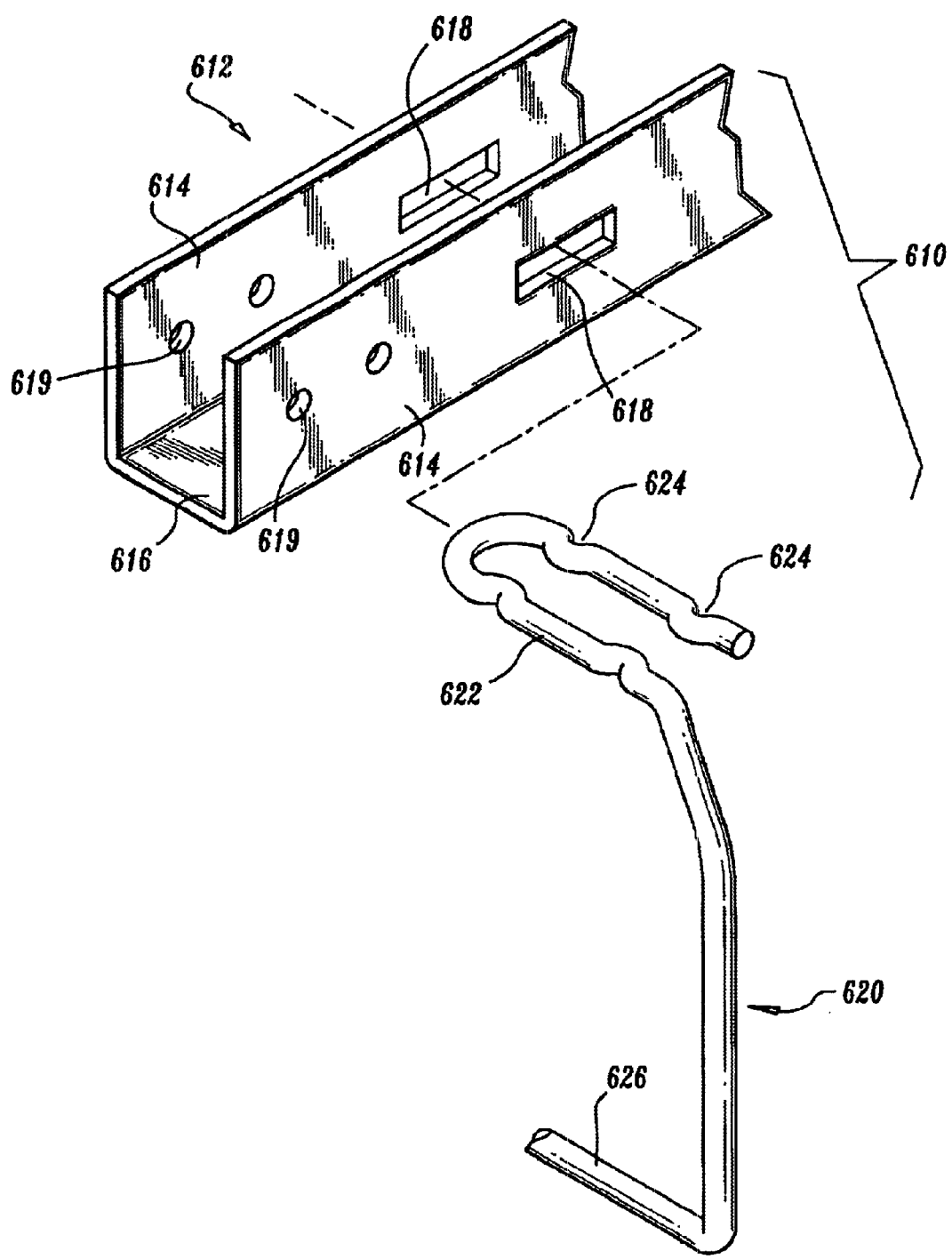
FIG. 17 is a perspective partial view of one embodiment of an article support section for use in an article support apparatus, illustrating joining of an article support member to a rigid spine member.

Referring now to FIG. 16, a flexible cable support apparatus 500 is illustrated in a preferred embodiment wherein a flexible connecting member 530 joins two cable support sections 510 to form a horizontal bend. A rigid longitudinal member 512 supports a plurality of transverse support members 516 forming an approximately "C" shaped cable support area 515 cross section. In one preferred configuration, support members 516 are at least partially suspended below a longitudinal member 512 and have a loop 520 formed on at least one of the ends of transverse support member 516. Longitudinal member 512 and support members 516 are preferably metal wires or bars of suitable load-bearing capacity, for example, but can also be fabricated from suitable composite materials or plastics. Flexible cable support apparatus 500 is preferably configured and dimensioned to support a plurality of cables so that it can be readily adapted to be installed beneath raised floor systems, on existing floors, on walls and risers or suspended from a ceiling.

Flexible connecting member 530 includes a flexible spine member 532 supporting a plurality of transverse supporting members 536. Flexible connecting member 530 can bend in any direction desired or required by a given installation requirement. Flexible spine 532 includes a hook portion 542 formed at a first end portion 541 and at a second end portion 543 to engage transverse cable support members 536 and 516. Connecting member 530 defines a cable support area 515 with a similar "C" shaped cross-section as cable support area 535.

Cable support area cross-sections 415, 435, 515 and 535 can take any geometric shape or be connected with their respective longitudinal members in any suitable manner that facilitates defining a partially flexible cable passageway. Further enhancements that are envisioned include permanent, removable, or foldable shelves or vertical dividers positioned within the cable trays for segregating specific cable groups and facilitating access thereto.

Referring now to FIGS. 17–21, an article support section 610 is shown as an alternative embodiment of article or cable support section 110 of FIGS. 1–3. Article support section 610 includes a rigid spine member 612 and a plurality of article support members 620 configured to attach to the rigid spine member 612 along the length thereof. Like the rigid spine member 112 of FIG. 1, rigid spine member 612 is formed as a channel with a U-type cross-sectional area substantially along the overall length, including a pair of vertical members 614 and an interconnecting horizontal member 616. A plurality of mated opposing pairs of rectangular slots 618 are formed along the length of the vertical members 614 of the rigid spine member 612. Each pair of rectangular slots 618 is positioned at equal longitudinal distance to receive an article support member 620. Article support members 620 are formed from an elongate rod or wire stock including a U-shaped connecting end portion 622. Other suitable materials such as molded plastic or composites may also be utilized.

The U-shaped end portion 622 includes double joggle portions 624 configured to fit to the rectangular slots 618 of the rigid spine member 612. Joggle portions 624 may be formed in the wire stock by suitable known forming techniques. Once the U-shaped end portion 622 snaps in the rectangular slots 618, the article support member 620 self-locks with the spine member 612 and is prevented from coming out unless lateral force is applied by the operator. Compared to the welding-type mounting generally known in the art, this snap-in mounting structure affords many advantages.

Figure 18:
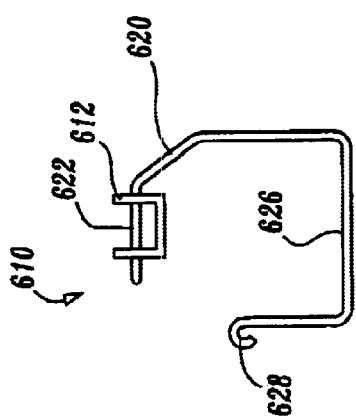
FIG. 18 is an end view illustrating an article support member mounted to the rigid spine member of FIG. 17.

For example, installation of article support member 620 on the rigid spine member 612 is greatly simplified and is thus very cost-effective. It further provides high flexibility since the operator can easily remove or replace specific article support members 620 when necessary or desirable. As shown in FIG. 18, upon mounting to rigid spine member 612, multiple article support members 620 define an open architecture longitudinal support area 626 beneath spine member 612 which facilitates supporting elongated objects thereon. Longitudinal support area 626 is particularly suitable for supporting a number of cable runs thereon. However, other elongated objects such as for example, conduit, hoses or the like may also be supported thereon. The other end portion 628 of the article support member 620 is preferably formed into a loop to prevent damage to objects such as cables when they are loaded there-upon.

Figure 19:
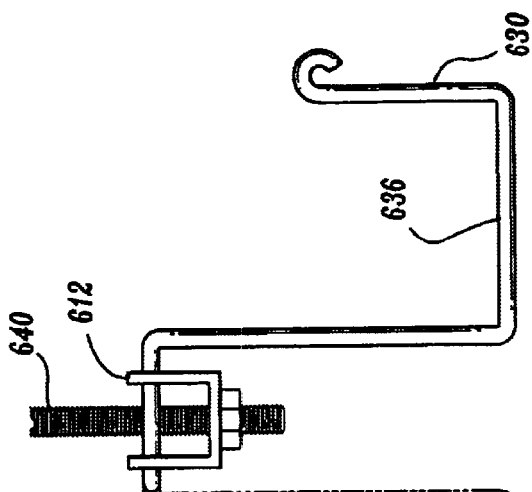
FIG. 19 is an end view illustrating a mounting structure of article support members with different configurations.
Figure 20:
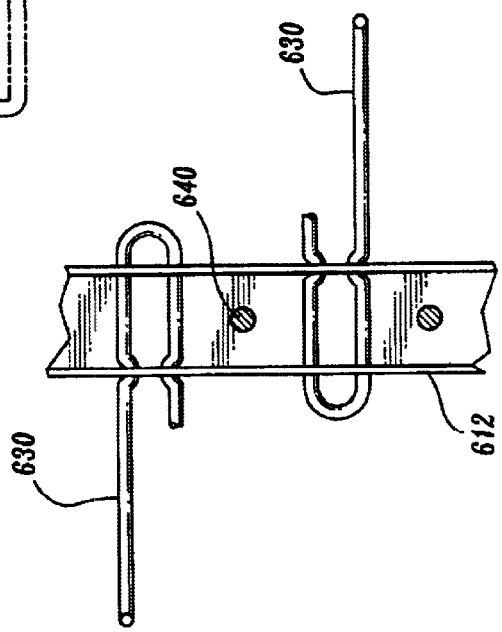
FIG. 20 is a top partial view of the embodiment of FIG. 19.

FIGS. 19 and 20 illustrate an alternative embodiment of article support members 630 mounted to the rigid spine member 612. Article support members 630 are in similar configurations with those shown in FIGS. 17 and 18 except they are formed to extend outward from spine member 612 defining article support areas 636 generally beside the rigid spine member 612, one on the left and one on the right. Rigid spine member 612 can be supported by vertical suspension rods 640 attached to the ceiling or joists. FIG. 20 illustrates, in top view, a portion of the rigid spine member 612 with a plurality of article support members 630 mounted there-upon.

Figure 21:
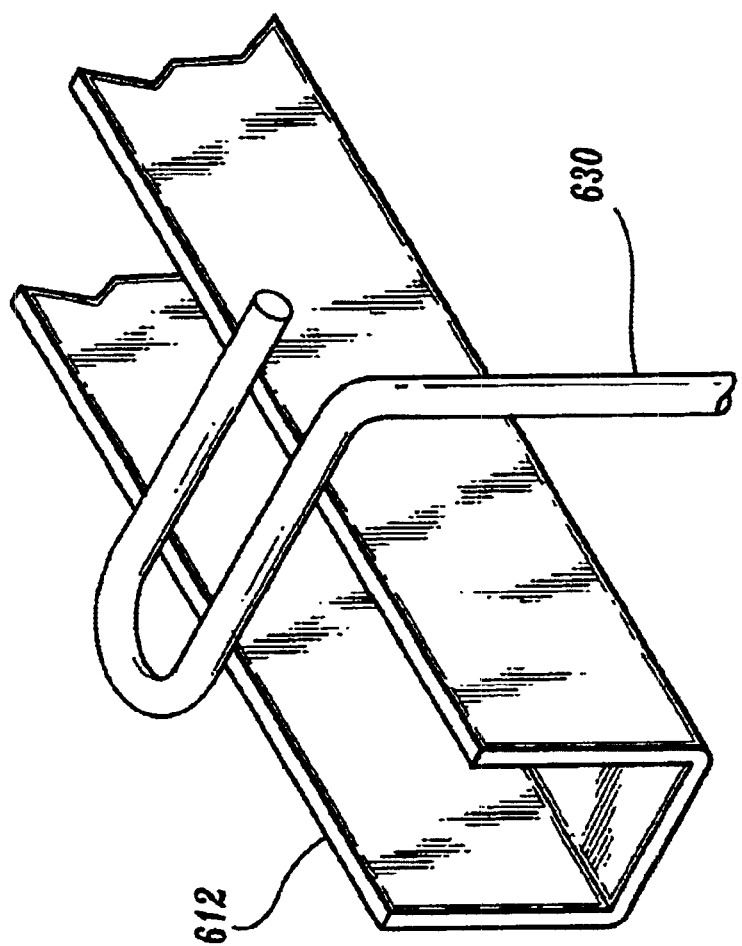
FIG. 21 is a perspective partial view illustrating alternate mounting structure of an article support section.

FIG. 21 illustrates another embodiment of mounting structure of article support members 630 to the rigid spine member 612. Here, the article support members 630 are welded on the top of the spine member 612. A particularly effective method of welding for this application is resistance welding.

Figure 23:
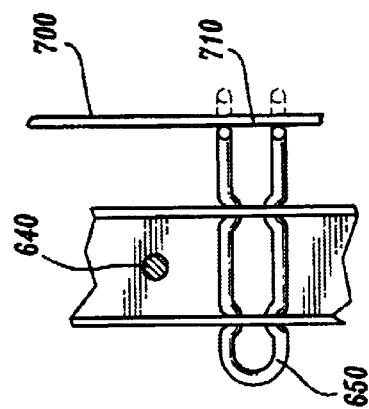
FIG. 23 is a top partial view of the embodiment of FIG. 22.
Figure 22:
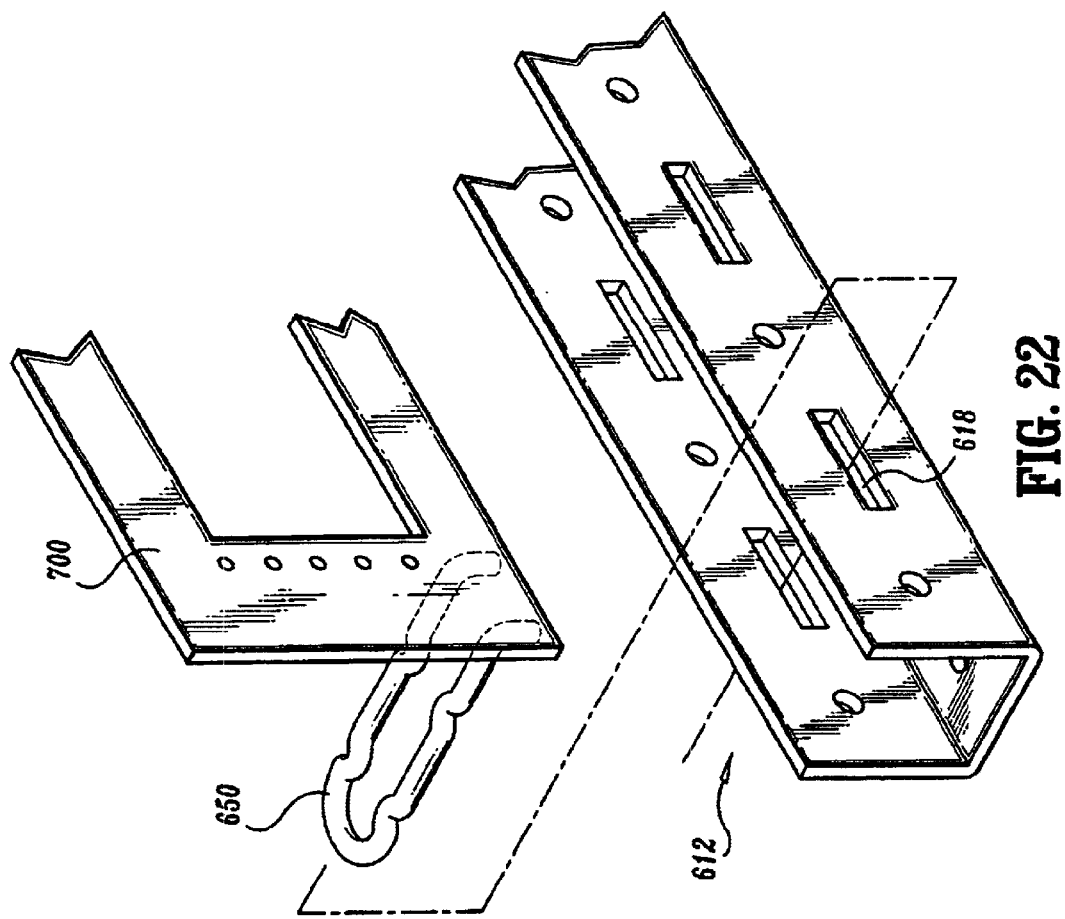
FIG. 22 is a perspective partial view of one embodiment of an article support section, illustrating mounting of an article support bracket to a rigid spine member.

Referring to FIGS. 22 and 23, another embodiment of article mounting structure is shown wherein particular articles or article support members are directly mounted to the rigid spine member 612. In this embodiment, various articles, for example, articles associated with cable runs supported by article support members 620 such as mounting bracket 700, can be configured to mount to the rigid spine member. Support members 650 may be attached, directly or indirectly, to mounting bracket 700. The support members 650 are formed in similar configurations as the U-shaped end portion 622 of FIGS. 17–21 to fit to the rectangular slots 618 of the rigid spine member 612. Thereby, upon snap-in attachment of the support members 650 to the slots 618, the rigid spine member 612 can detachably hold the mounting bracket 700 as seen in FIG. 23. Examples of articles which may be mounted on mounting bracket 700 include without limitation patch panels, switches, hubs as well as transition elements or accessories associated with the cable runs carried by article support sections 610. Further, as seen in phantom in FIG. 23, support member 650 can pass through a slot 710 formed in mounting bracket 700 and then through slots 618 formed in rigid spine member 612 in order to support mounting bracket 700 on rigid spine member 612.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. All such changes and modifications are intended to be included within the scope of the appended claims.

What is claimed is:

1. A cable support apparatus, comprising:
   at least two substantially rigid cable support sections defining a pathway for supporting cable; and
   an elongated flexible member interconnecting the at least two rigid cable support sections to form a flexible junction between the at least two substantially rigid cable support sections, the elongate flexible member includes a flexible spine member having a first end and a second end and at least one cable support member attached to the flexible spine member, the flexible spine member including a coupling member formed at each of the first and second ends, each coupling member being configured and adapted to selectively couple the elongate flexible member between the at least two substantially rigid cable support sections, wherein the coupling member formed at each of the first and second ends of the flexible spine member is a down turned hook, wherein the down turned hook is configured and adapted to rest on a portion of the substantially rigid cable support.

2. The cable support apparatus according to claim 1, wherein the flexible spine member is bendable, by hand, in at least one of a vertical and a horizontal direction to a selected set configuration.

3. The cable support apparatus according to claim 1, wherein each cable support member of the elongate flexible member is substantially U-shaped.

4. The cable support apparatus according to claim 3, wherein each cable support member of the elongate flexible member includes a base portion having two first portions which extend upwardly, at an angle, away from the base portion.

5. The cable support apparatus according to claim 4, wherein at least the first portions of the first and last cable support member are provided with inwardly oriented second portions, wherein inwardly oriented second portions are configured and adapted to engage the substantially rigid cable support sections.

6. The cable support apparatus according to claim 5, wherein each of the substantially rigid cable support sections includes a plurality of longitudinal members interconnected by a plurality of transverse cable support members, whereby the longitudinal members and the transverse cable support members define a cable support area having a cross-section which substantially corresponds to the cross-section of the cable support member of the elongate flexible member.

7. The cable support apparatus according to claim 6, wherein the transverse cable support members include a base portion has a first portion extending upwardly, at an angle, from either end thereof and a second portion extending upwardly from the free end of each first portion, wherein the free end of each second portion terminates in a coupling member, wherein the coupling member of the transverse cable support members is configured and adapted to receive the inwardly oriented second portions of the cable support members of the elongate flexible member and wherein the coupling member formed at the ends of the flexible spine member engage the base portion of a transverse cable support member.

8. The cable support apparatus according to claim 1, wherein each cable support member of the elongate flexible member is substantially C-shaped and is suspended from the flexible spine member.

9. The cable support apparatus according to claim 8, wherein each of the substantially rigid cable support sections includes a rigid longitudinal member supporting a plurality of suspended transverse support members, wherein the transverse support members have a cross-section which substantially corresponds to the cross-section of the cable support member of the elongate flexible member.

10. The cable support apparatus according to claim 9, wherein the coupling member formed at the ends of the flexible spine member engage a transverse support member of the substantially rigid cable support sections.

11. A cable support apparatus, comprising:
at least two substantially rigid cable support sections defining a pathway for supporting cable, each of the at least two cable support sections includes:
a plurality of transverse elements, each transverse element having a horizontal portion and a riser portion disposed on either end of the horizontal portion; and
a plurality of longitudinal elements interconnecting each of the plurality of transverse and riser elements; and an elongated flexible member interconnecting the at least two rigid cable support sections to form a flexible junction between the at least two substantially rigid cable support sections, the elongate flexible member includes a flexible spine member having a first end and a second end and at least one cable support member attached to the flexible spine member, the flexible spine member including a coupling member formed at each of the first and second ends, each coupling member comprising a down turned hook and being configured and adapted to selectively couple the elongate flexible member between the at least two substantially rigid cable support sections.

12. The cable support apparatus according to claim 11, wherein each of the at least one cable support members includes a horizontal portion and a riser portion disposed on either end thereof.

13. The cable support apparatus according to claim 12, wherein the coupling member formed at each of the first and second ends of the flexible spine member is a hook member configured and adapted to engage a horizontal portion of the plurality of transverse elements.

14. The cable support apparatus according to claim 11, wherein the flexible spine member is bendable, by hand, in at least one of a vertical and a horizontal direction to a selected set configuration.

15. The cable support apparatus according to claim 11, wherein the flexible spine member is bendable in at least one of an X, Y and Z direction.

16. The cable support apparatus according to claim 15, wherein each of the at least one cable support members includes a horizontal portion and a riser portion disposed on either end thereof.

* * * * *